US012707362B2

(12) United States Patent
He et al.

(10) Patent No.: US 12,707,362 B2
(45) Date of Patent: Aug. 11, 2026

(54) DEVICE AND METHOD FOR PERFORMING HANDOVER IN CONSIDERATION OF BATTERY EFFICIENCY IN WIRELESS COMMUNICATION SYSTEM

(71) Applicant: LG Electronics Inc., Seoul (KR)

(72) Inventors: Yecheng He, Seoul (KR); Jaeky Oh, Seoul (KR); Jaehoon Chung, Seoul (KR); Jae Yong Park, Seoul (KR); Sungjin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 266 days.

(21) Appl. No.: 18/288,936

(22) PCT Filed: Jun. 11, 2021

(86) PCT No.: PCT/KR2021/007342

§ 371 (c)(1),
(2) Date: Oct. 30, 2023

(87) PCT Pub. No.: WO2022/260200

PCT Pub. Date: Dec. 15, 2022

(65) Prior Publication Data

US 2024/0205775 A1 Jun. 20, 2024

(51) Int. Cl.
*H04W 36/22* (2009.01)
*H04W 36/00* (2009.01)
(Continued)

(52) U.S. Cl.
CPC ....... *H04W 36/22* (2013.01); *H04W 36/0058* (2018.08); *H04W 36/00837* (2018.08);
(Continued)

(58) Field of Classification Search
CPC ............. H04W 36/22; H04W 36/0058; H04W 36/00837; H04W 36/08; H04W 36/302;
(Continued)

(56) References Cited

U.S. PATENT DOCUMENTS

| | | | |
|---|---|---|---|
| 8,811,502 B2 | 8/2014 | Karabinis | |
| 9,398,508 B1 * | 7/2016 | Velusamy | H04W 36/0061 |

(Continued)

FOREIGN PATENT DOCUMENTS

| | | |
|---|---|---|
| KR | 10-0802154 | 2/2008 |
| KR | 10-1258196 | 4/2013 |

(Continued)

*Primary Examiner* — Santiago Garcia
(74) *Attorney, Agent, or Firm* — Fish & Richardson P.C.

(57) ABSTRACT

The present disclosure relates to performing a handover in consideration of battery efficiency in a wireless communication system, and a method performed by a terminal includes receiving information related to a threshold of signal strength for triggering a measurement report from a base station, transmitting a measurement report to the base station based on the information related to the threshold, and performing a handover from the base station to a neighbor base station, and the threshold may be determined based on a probability distribution determined based on information observed by terminals performing a handover in the base station.

14 Claims, 24 Drawing Sheets

(51) Int. Cl.
*H04W 36/08* (2009.01)
*H04W 36/30* (2009.01)
*H04W 36/36* (2009.01)

(52) U.S. Cl.
CPC ......... *H04W 36/08* (2013.01); *H04W 36/302* (2023.05); *H04W 36/36* (2013.01)

(58) Field of Classification Search
CPC ......... H04W 36/36; H04W 36/008375; H04W 36/165; H04W 8/24; H04W 36/32; Y02D 30/70
See application file for complete search history.

(56) References Cited

U.S. PATENT DOCUMENTS

| | | | | |
|---|---|---|---|---|
| 9,924,418 | B1* | 3/2018 | Cuberovic | H04W 36/0061 |
| 10,440,639 | B1* | 10/2019 | Vivanco | H04W 36/0061 |
| 2003/0007470 | A1* | 1/2003 | Grilli | H04W 56/0015 370/335 |
| 2010/0029276 | A1* | 2/2010 | Hwang | H04W 36/304 455/436 |
| 2010/0093358 | A1* | 4/2010 | Cheong | H04W 36/0055 455/444 |
| 2010/0278143 | A1* | 11/2010 | Chun | H04W 36/0033 370/331 |
| 2010/0285831 | A1* | 11/2010 | Jung | H04L 27/0012 455/524 |
| 2013/0095819 | A1* | 4/2013 | Cheng | H04W 36/0094 455/424 |
| 2017/0215117 | A1* | 7/2017 | Kwon | H04W 36/302 |
| 2021/0083760 | A1* | 3/2021 | Schmidt | H04B 7/18504 |
| 2021/0218466 | A1* | 7/2021 | Ökvist | H04W 84/06 |
| 2021/0345201 | A1* | 11/2021 | Cheng | H04W 24/10 |
| 2022/0095267 | A1* | 3/2022 | Shafin | G01S 5/0278 |
| 2022/0353762 | A1* | 11/2022 | Venkata | H04W 8/22 |
| 2023/0043232 | A1* | 2/2023 | Ryu | H04W 76/27 |

FOREIGN PATENT DOCUMENTS

| | | |
|---|---|---|
| KR | 10-2019-0054749 | 5/2019 |
| KR | 10-2020-0095469 | 8/2020 |

* cited by examiner

START

S2201

RECEIVE INFORMATION RELATED TO THRESHOLD OF SIGNAL STRENGTH FOR TRIGGERING MEASUREMENT REPORT

S2203

RECEIVE MEASUREMENT REPORT GENERATED BASED ON INFORMATION RELATED TO THRESHOLD

S2205

CONTROL TO PERFORM HANDOVER TO NEIGHBOR BASE STATION BASED ON MEASUREMENT REPORT

END

DEVICE AND METHOD FOR PERFORMING HANDOVER IN CONSIDERATION OF BATTERY EFFICIENCY IN WIRELESS COMMUNICATION SYSTEM

CROSS-REFERENCE TO RELATED APPLICATIONS

This application is a National Stage application under 35 U.S.C. § 371 of International Application No. PCT/KR2021/007342, filed on Jun. 11, 2021. The disclosure of the prior application in incorporated by reference in its entirety.

TECHNICAL FIELD

The present disclosure relates to a wireless communication system, and more particularly, to a method and apparatus for performing a handover by considering battery efficiency in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a device and method for improving battery efficiency in a wireless communication system.

The present disclosure may provide a device and method for reducing battery consumption due to a handover in a wireless communication system.

The present disclosure may provide a device and method for securing battery efficiency during a handover while maintaining the quality of service in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method performed by a terminal in a wireless communication system includes receiving information related to a threshold of signal strength for triggering a measurement report from a base station, transmitting a measurement report to the base station based on the information related to the threshold, and performing a handover from the base station to a neighbor base station, and the threshold may be determined based on a probability distribution determined based on information observed by terminals performing a handover in the base station.

As an example of the present disclosure, a method performed by a base station in a wireless communication system includes transmitting information related to a threshold of signal strength for triggering a measurement report to a terminal, receiving a measurement report generated by the terminal based on the information related to the threshold, and controlling the terminal to perform a handover from the base station to a neighbor base station, and the threshold may be determined based on a probability distribution determined based on information observed by terminals performing a handover in the base station.

As an example of the present disclosure, a terminal in a wireless communication system includes a transceiver and a processor coupled with the transceiver. The processor is configured to receive information related to a threshold of signal strength for triggering a measurement report from a base station, to transmit a measurement report to the base station based on the information related to the threshold, and to perform a handover from the base station to a neighbor base station, and the threshold may be determined based on a probability distribution determined based on information observed by terminals performing a handover in the base station.

As an example of the present disclosure, a base station in a wireless communication system includes a transceiver and a processor coupled with the transceiver. The processor is configured to transmit information related to a threshold of signal strength for triggering a measurement report to a terminal, to receive a measurement report generated by the terminal based on the information related to the threshold, and to control the terminal to perform a handover from the base station to a neighbor base station, and the threshold may be determined based on a probability distribution determined based on information observed by terminals performing a handover in the base station.

As an example of the present disclosure, a device includes at least one processor and at least one computer memory coupled with the at least one processor and storing a command instructing operations when executed by the at least one processor, and the operations controls the device to receive information related to a threshold of signal strength for triggering a measurement report from a base station, to transmit a measurement report to the base station based on the information related to the threshold, and to perform a handover from the base station to a neighbor base station, and the threshold may be determined based on a probability distribution determined based on information observed by terminals performing a handover in the base station.

As an example of the present disclosure, a non-transitory computer-readable medium storing at least one or more instructions includes the at least one or more instructions executable by a processor, and the at least one or more instructions control a device to receive information related to a threshold of signal strength for triggering a measurement report from a base station, to transmit a measurement report to the base station based on the information related to the threshold, and to perform a handover from the base station to a neighbor base station, and the threshold may be determined based on a probability distribution determined based on information observed by terminals performing a handover in the base station.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, it is possible to effectively perform a handover while maintaining the quality of service and improving battery efficiency.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
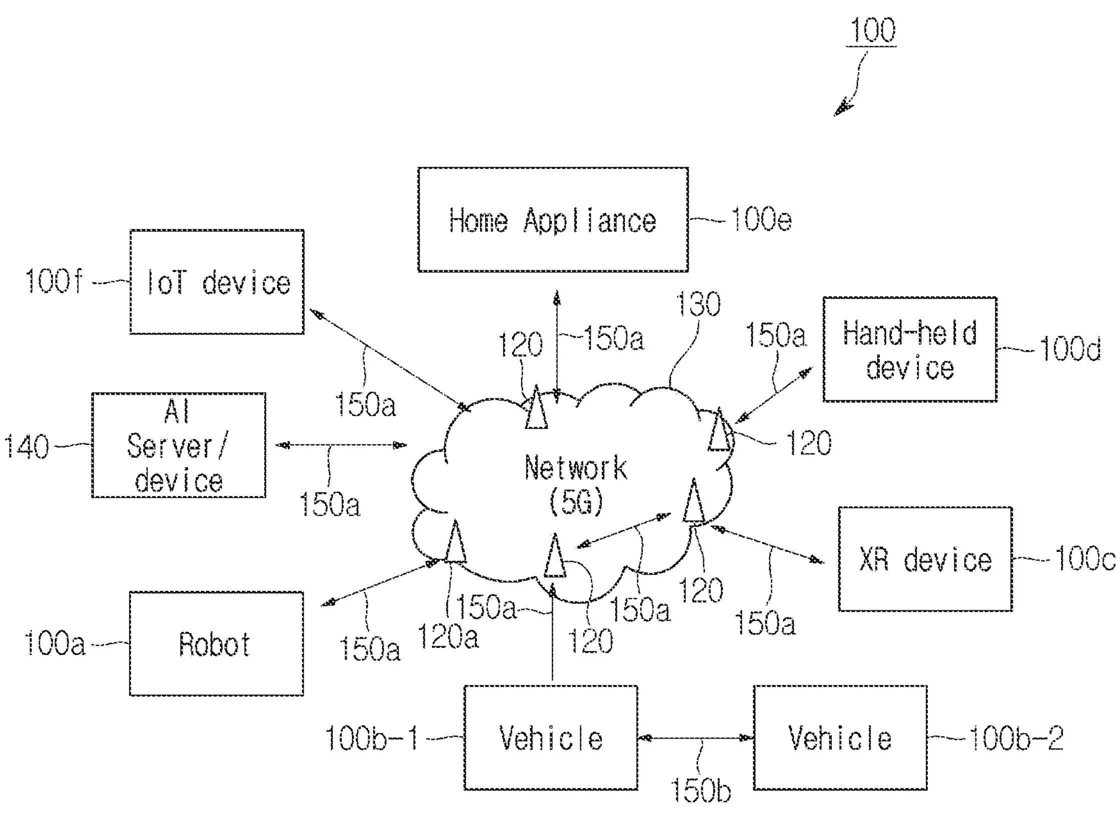
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one," "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
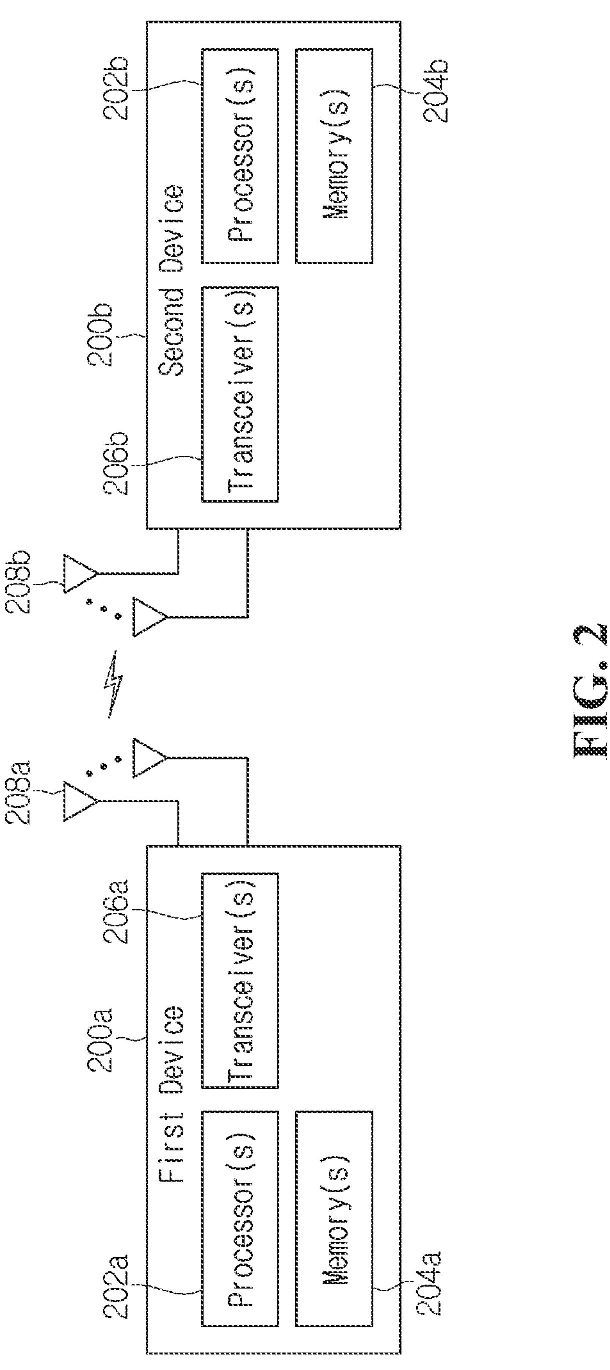
FIG. 2 is a view showing an example of a wireless apparatus applicable to the present disclosure.

FIG. 2 is a view showing an example of a wireless device applicable to the present disclosure.

Referring to FIG. 2, a first wireless device 200*a* and a second wireless device 200*b* may transmit and receive radio signals through various radio access technologies (e.g., LTE or NR). Here, (the first wireless device 200*a*, the second wireless device 200*b*) may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
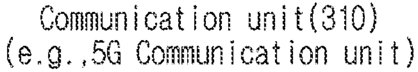
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
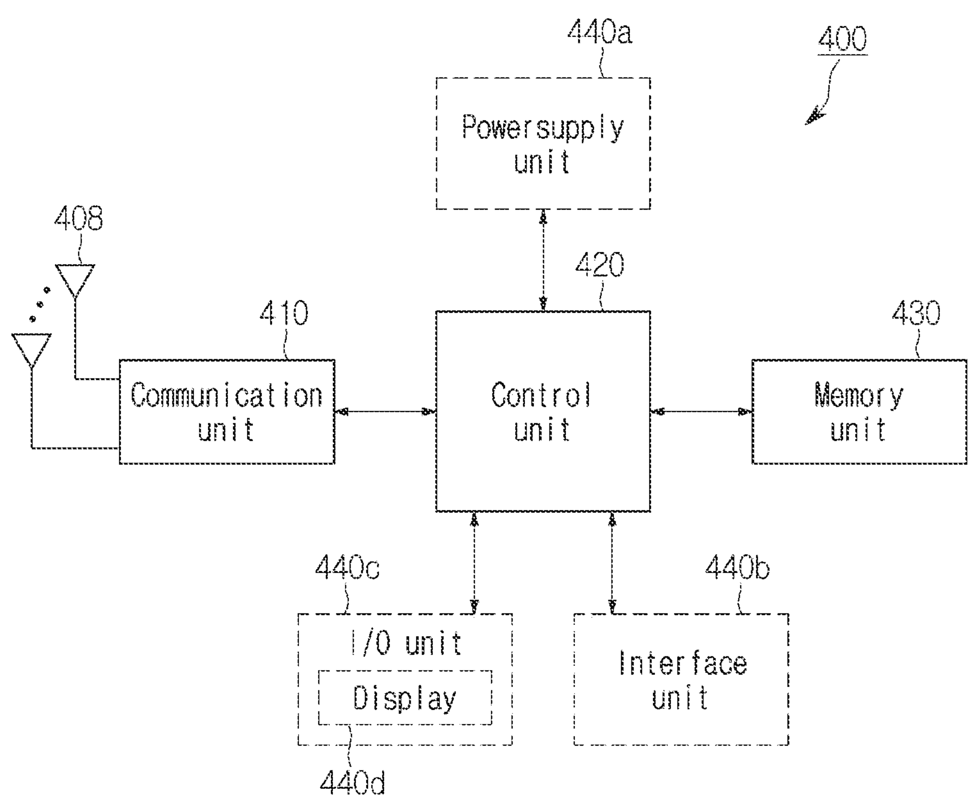
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
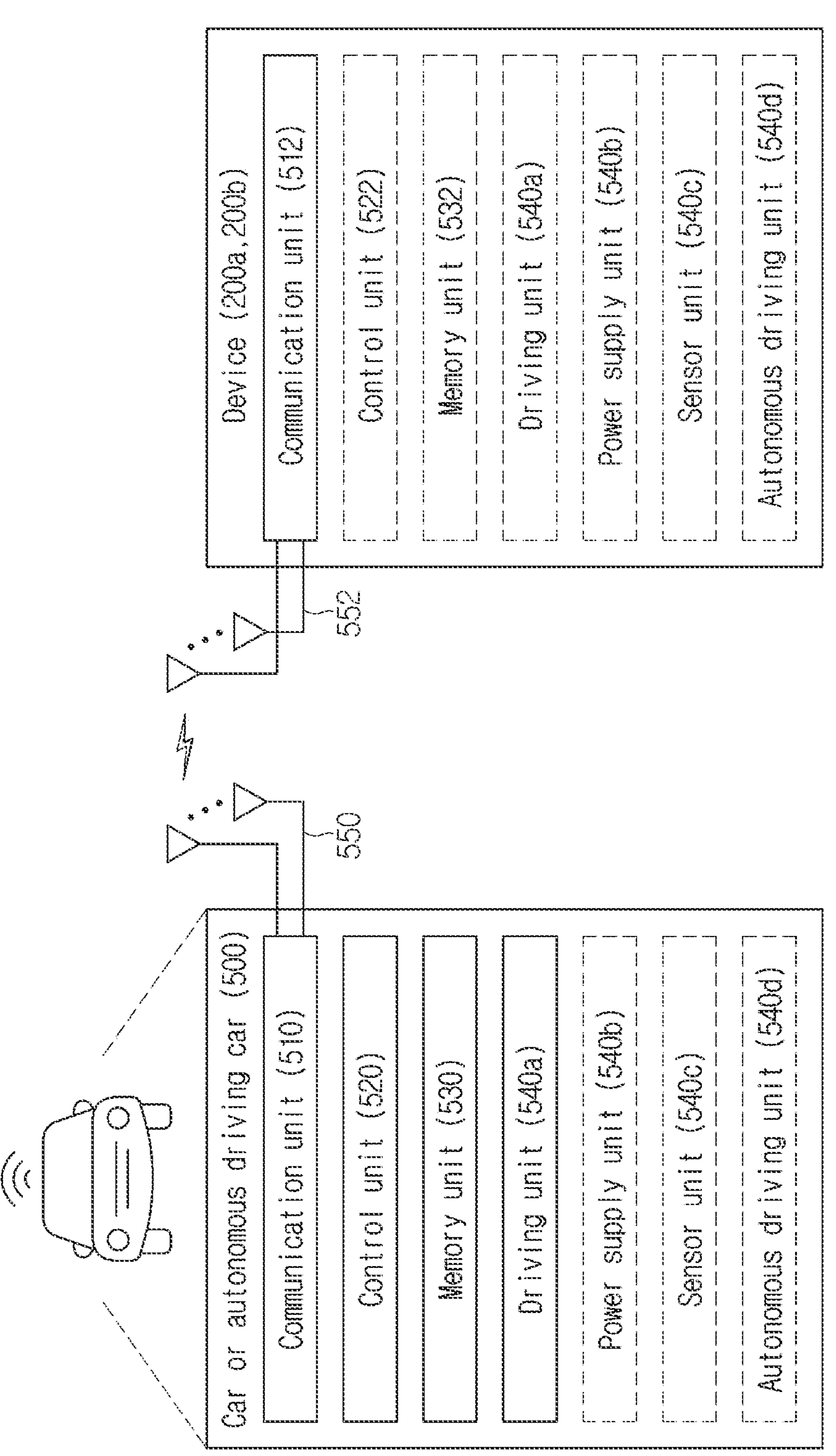
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver)510, a control unit (controller)520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
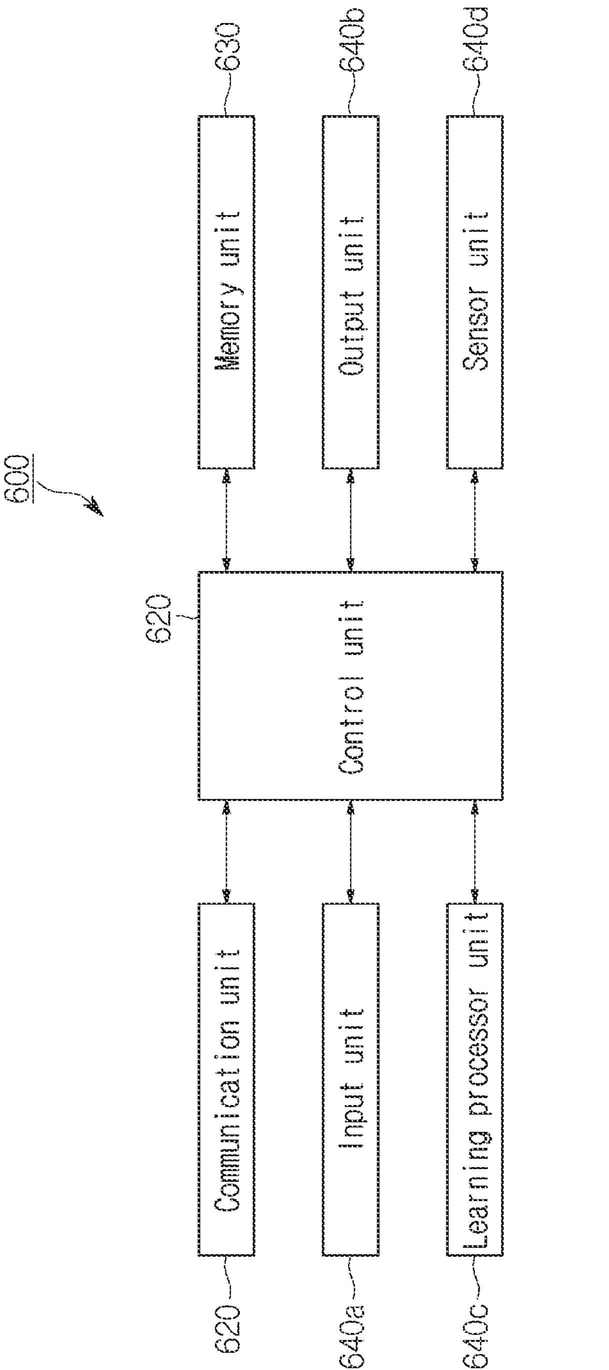
FIG. 6 is a view showing an example of artificial intelligence (AI) device applicable to the present disclosure.

FIG. 6 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
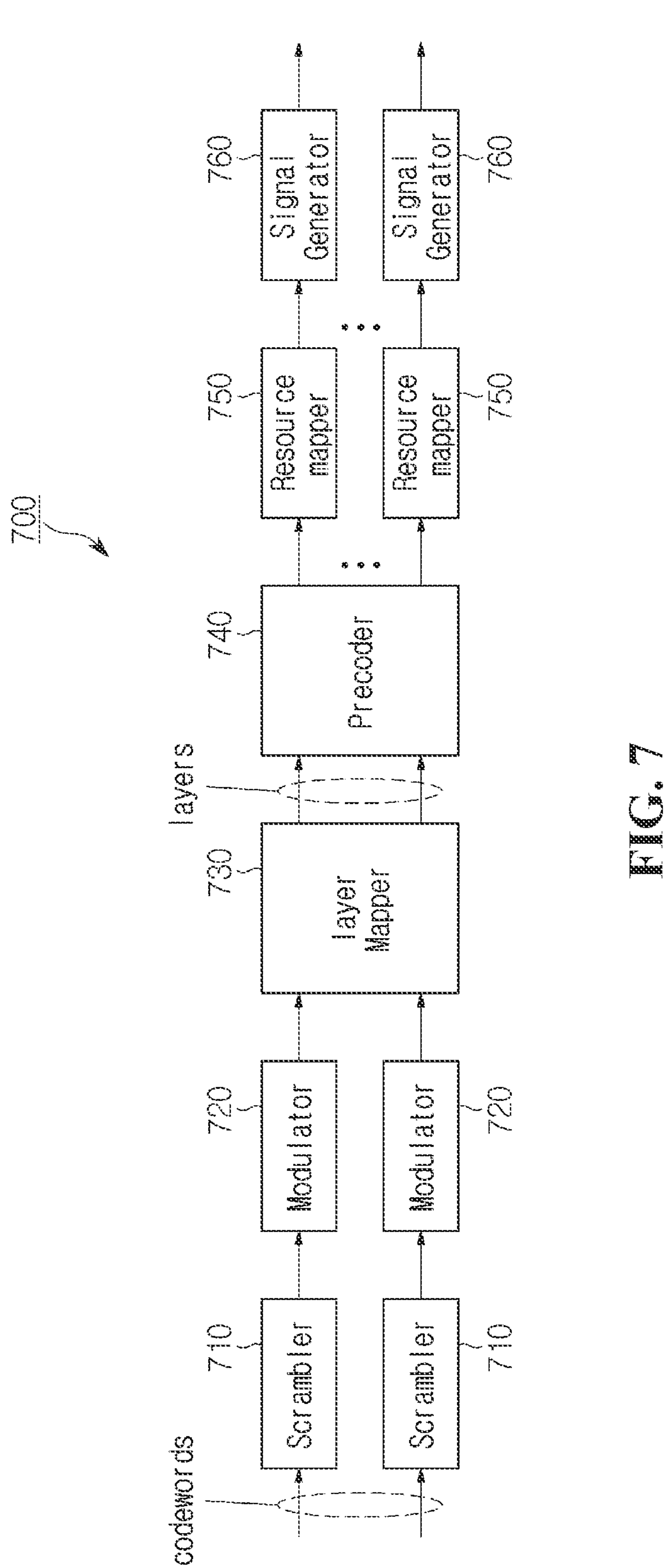
FIG. 7 is a view showing a method of processing a transmitted signal applicable to the present disclosure.
Figure 8:
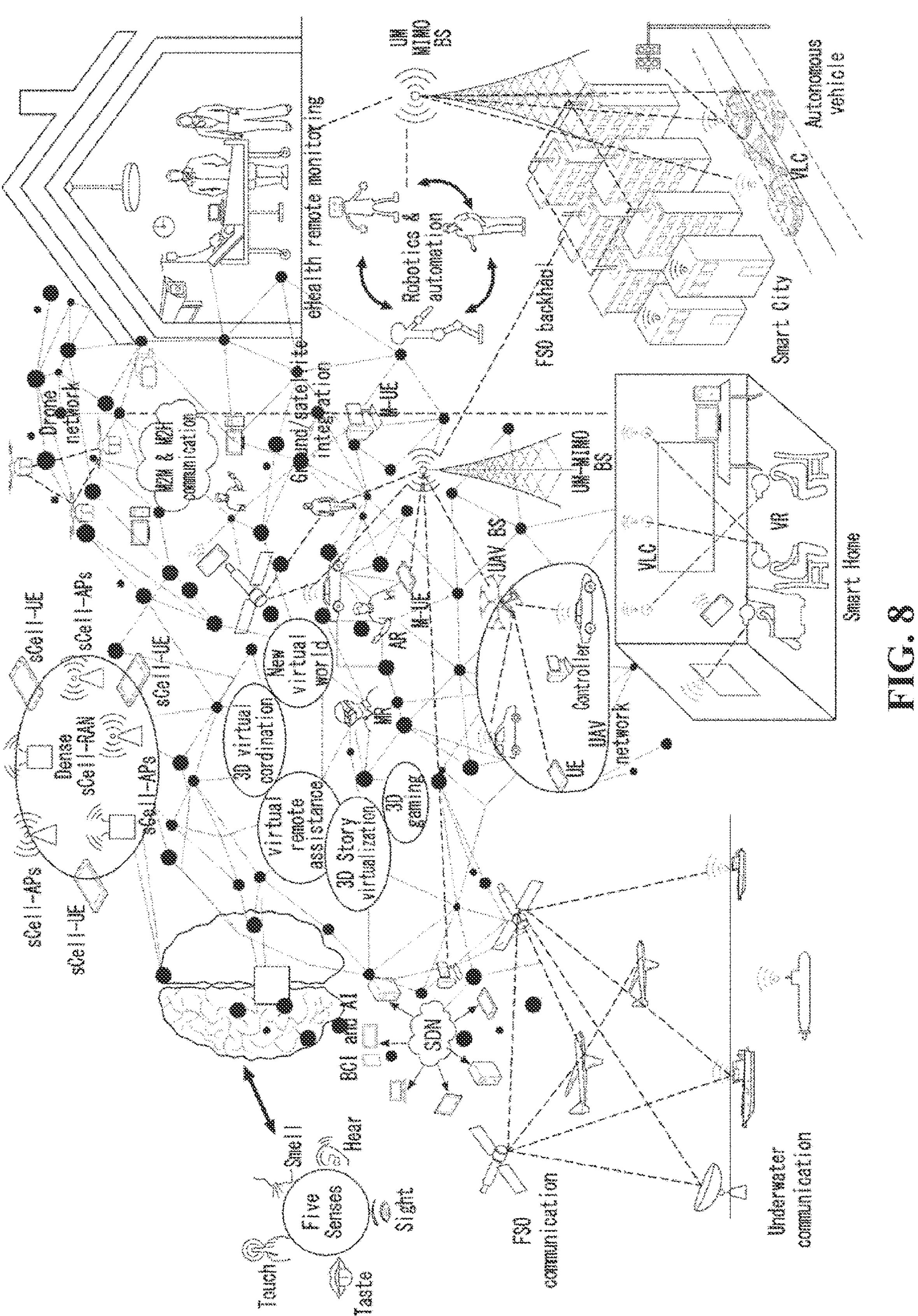
FIG. 8 is a view showing an example of a communication structure providable in a 6th generation (6G) system applicable to the present disclosure.

FIG. 7 is a view showing a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device. (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 60 system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 10:
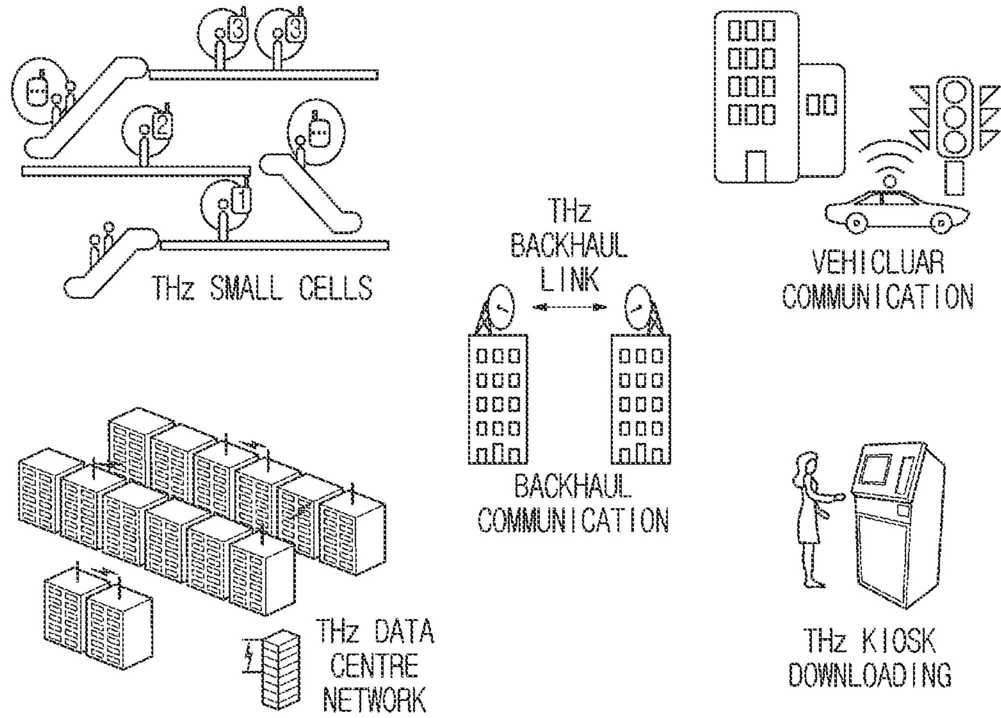
FIG. 10 is a view showing a THz communication method applicable to the present disclosure.

FIG. 10 is a view showing an example of a communication structure providable in a 6G system applicable to the present disclosure.

Referring to FIG. 10, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 60 system may provide advanced battery technology for energy harvesting and very long battery life and thus mobile devices may not need to be separately charged in the 6G system.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 9:
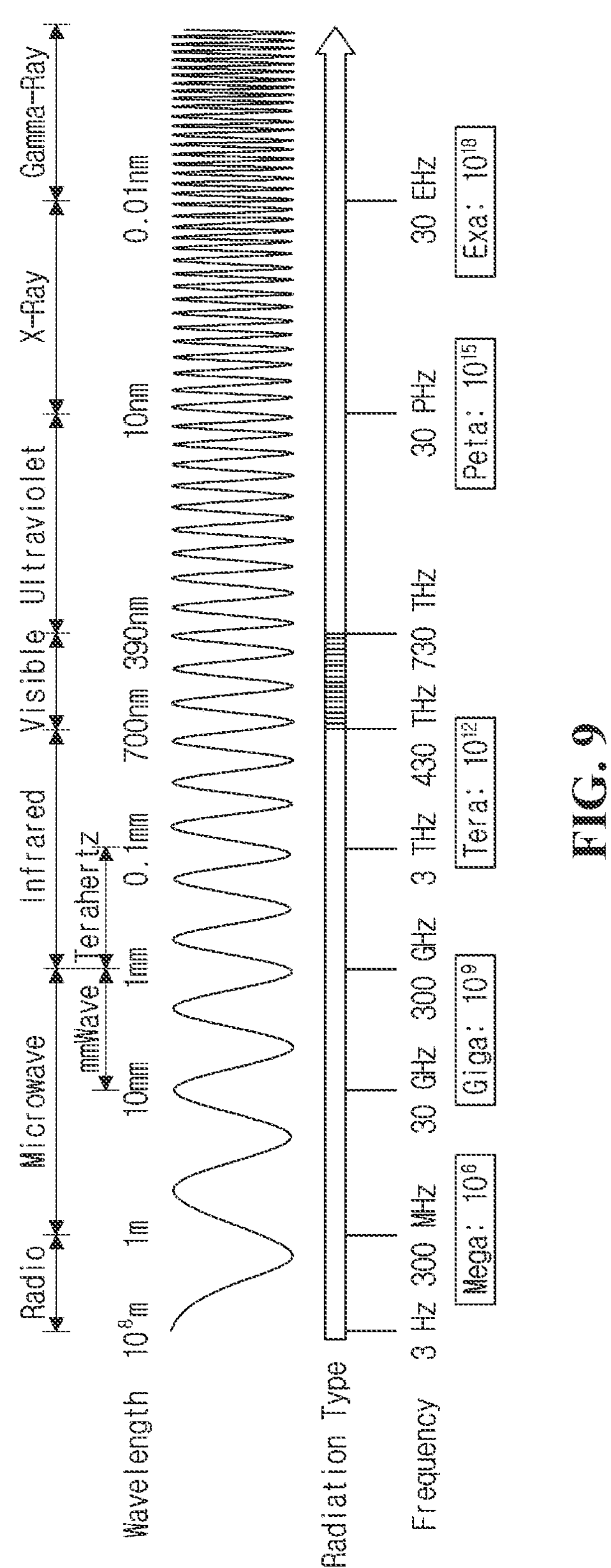
FIG. 9 is a view showing an electromagnetic spectrum applicable to the present disclosure.

FIG. 9 is a view showing an electromagnetic spectrum applicable to the present disclosure. For example, referring to FIG. 9, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

FIG. 10 is a view showing a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

Artificial Intelligence System

Figure 11:
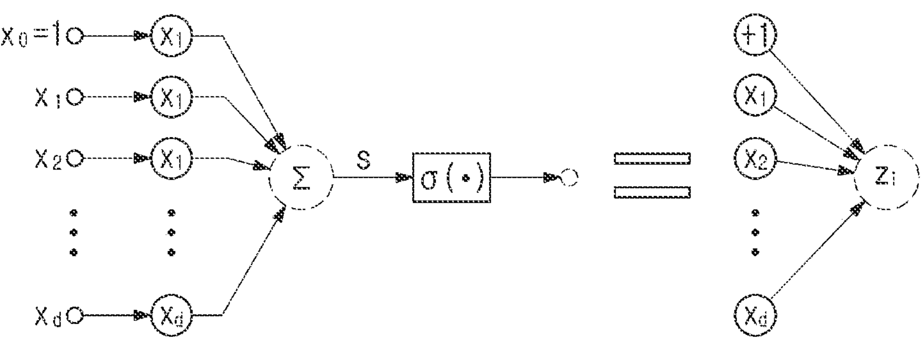
FIG. 11 is a view showing a perceptron architecture in an artificial neural network applicable to the present disclosure.
Figure 12:
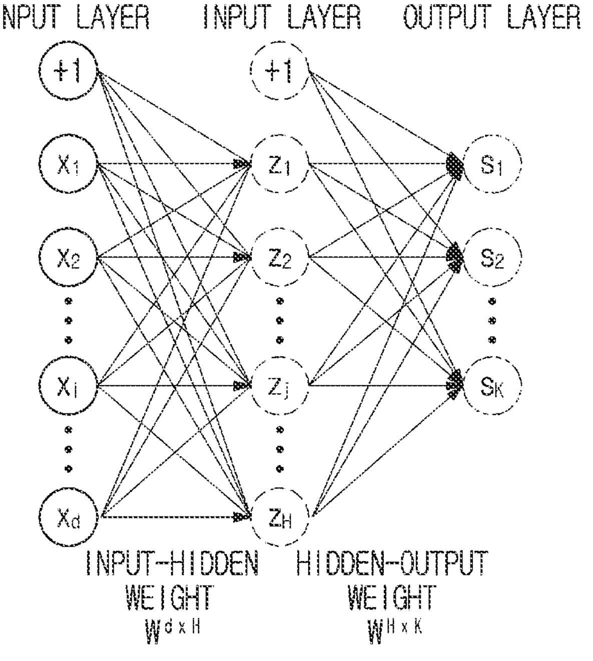
FIG. 12 is a view showing an artificial neural network architecture applicable to the present disclosure.

FIG. 11 is a view showing a perceptron architecture in an artificial neural network applicable to the present disclosure. In addition, FIG. 12 is a view showing an artificial neural network architecture applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 11, an artificial neural network may consist of a plurality of perceptrons. Herein, when an input vector x={x1, x2, . . . , xd} is input, each component is multiplied by a weight {W1, W2, . . . , Wd}, results are all added up, and then an activation function σ( ) is applied, of which the overall process may be referred to as a perceptron. For a large artificial neural network architecture, when expanding the simplified perceptron structure illustrated in FIG. 11, an input may be applied to different multidimensional perceptrons. For convenience of explanation, an input value or an output value will be referred to as a node.

Meanwhile, the perceptron structure illustrated in FIG. 11 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 12.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 24, but since an input layer is excluding in counting the number of actual artificial neural network layers, it can be understood that the artificial neural network illustrated in FIG. 23 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 13:
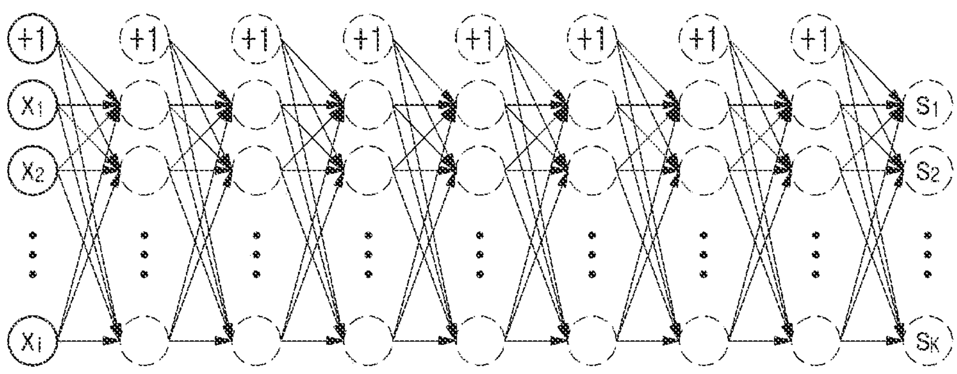
FIG. 13 is a view showing a deep neural network applicable to the present disclosure.

FIG. 13 is a view showing a deep neural network applicable to the present disclosure.

Referring to FIG. 13, a deep neural network may be a multilayer perceptron consisting of 8 layers (hidden layers+output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 14:
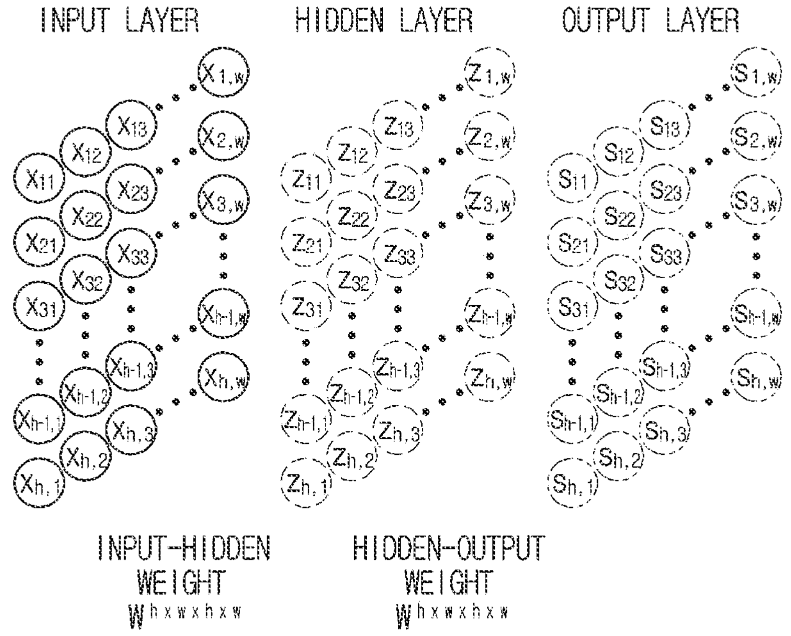
FIG. 14 is a view showing a convolutional neural network applicable to the present disclosure.
Figure 15:
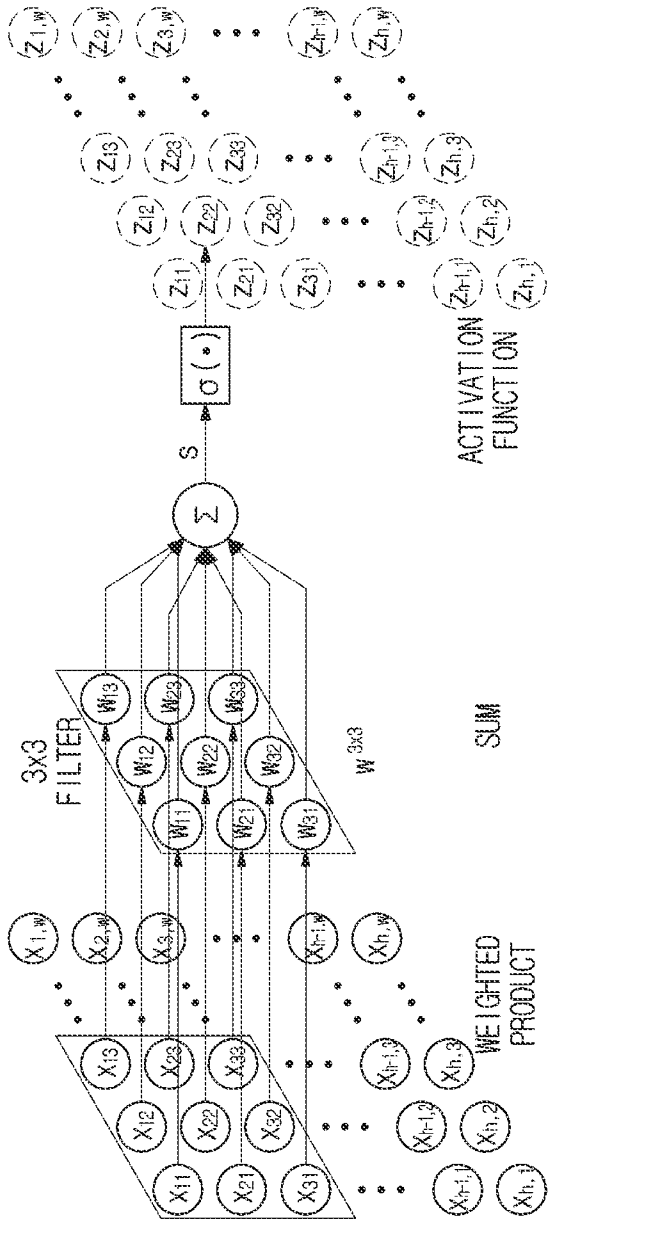
FIG. 15 is a view showing a filter operation of a convolutional neural network applicable to the present disclosure.

FIG. 14 is a view showing a convolutional neural network applicable to the present disclosure. In addition, FIG. 15 is a view showing a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 14, it is possible to assume a two-dimensional array of w horizontal nodes and h vertical nodes (the convolutional neural network structures of FIG. 14). In this case, since a weight is applied to each connection in a process of connecting one input node to a hidden layer, a total of h×w weights should be considered. As there are h×w nodes in an input layer, a total of h2w2 weights may be needed between two neighboring layers.

Furthermore, as the convolutional neural network of FIG. 14 has the problem of exponential increase in the number of weights according to the number of connections, the presence of a small filter may be assumed instead of considering every mode of connections between neighboring layers. As an example, as shown in FIG. 15, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 15, a 3×3 filter may be applied to a top rightmost 3×3 area of an input layer, and an output value, which is a result of the weighted summation and activation function operation for a corresponding node, may be stored at 722.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Tus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 16:
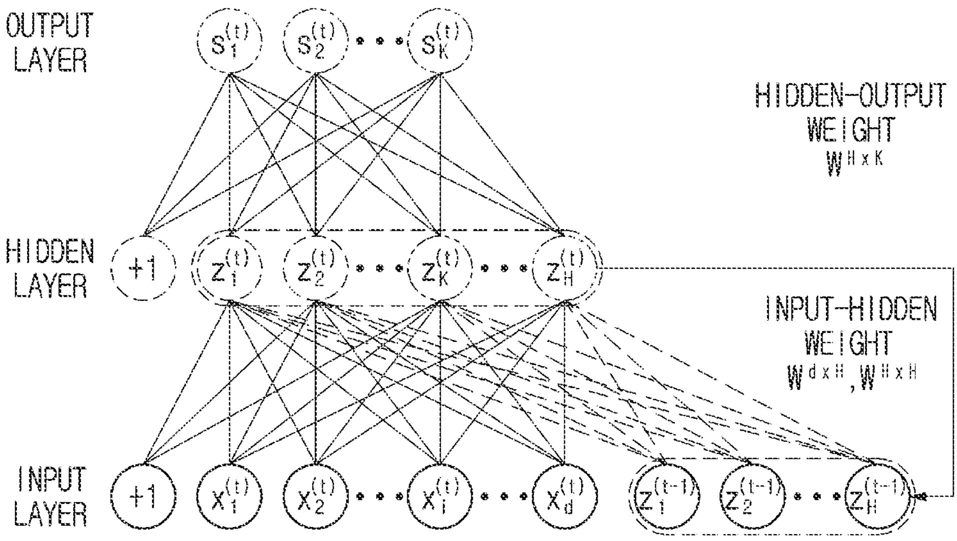
FIG. 16 is a view showing a neural network architecture with a recurrent loop applicable to the present disclosure.

FIG. 16 is a view showing a neural network architecture with a recurrent loop applicable to the present disclosure.

Figure 17:
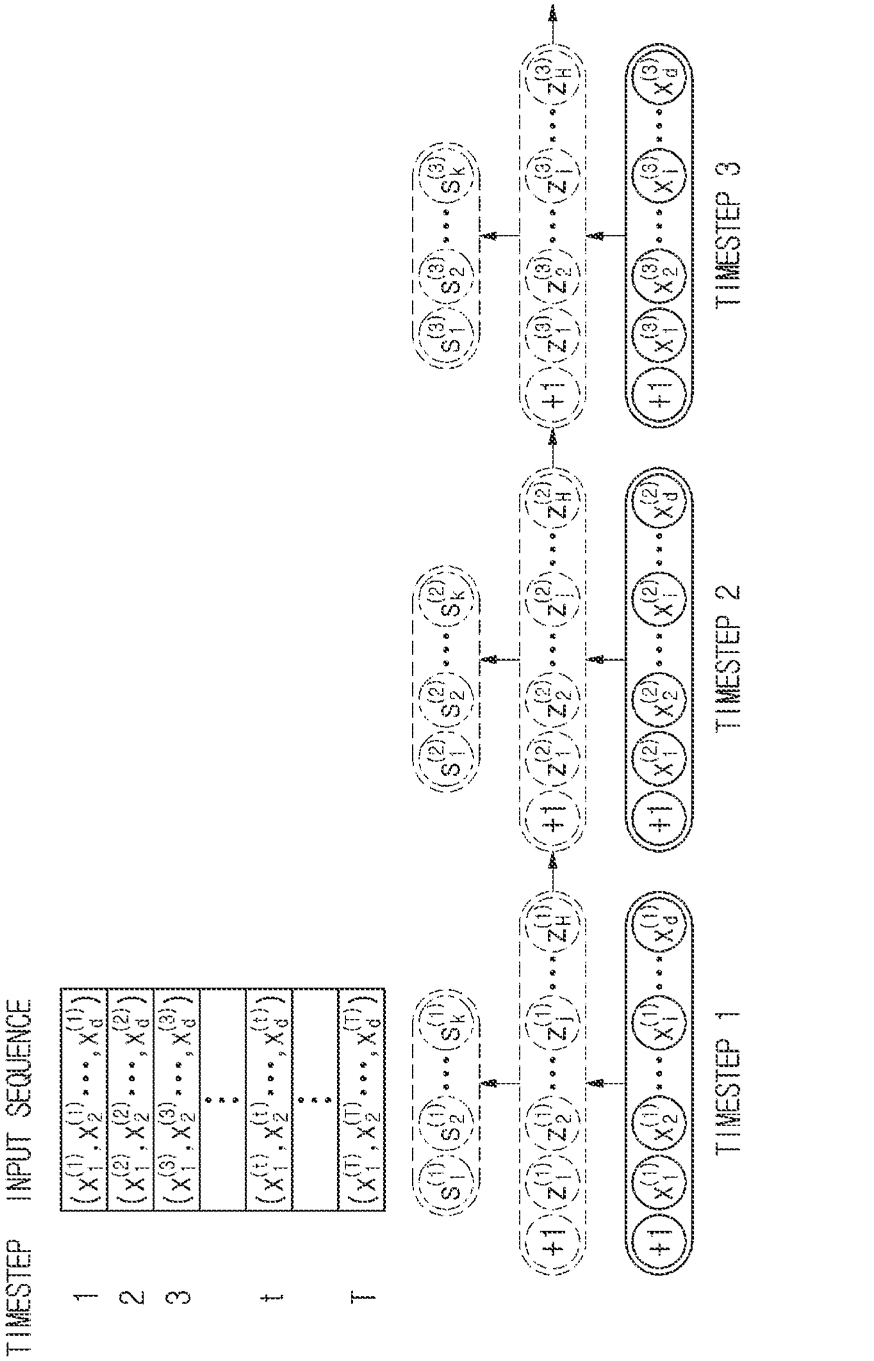
FIG. 17 is a view showing an operational structure of a recurrent neural network applicable to the present disclosure.

FIG. 17 is a view showing an operational structure of a recurrent neural network applicable to the present disclosure.

Referring to FIG. 16, a recurrent neural network (RNN) may have a structure which applies a weighted sum and an activation function by inputting hidden vectors {z1(t−1), z2(t−1), . . . , zH(t−1)} of an immediately previous timestep t−1 during a process of inputting elements {x1(t), x2(t), . . . , xd(t)} of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 17, a recurrent neural network may operate in a predetermined timestep order for an input data sequence. Herein, as a hidden vector {z1(1), z2(1), . . . , zH(1)} at a time of inputting an input vector {x1(t), x2(t), . . . , xd(t)} of timestep 1 into a recurrent neural network is input together with an input vector {x1(2), x2(2), . . . , xd(2)} of timestep 2, a vector {z1(2), z2(2), . . . , zH(2)} of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiment of the Present Disclosure

The present disclosure relates to a handover technique, and more particularly, to a technique of controlling a time for performing a handover. Specifically, the present disclosure proposes an artificial intelligence-based handover technique considering battery efficiency of a wireless device/terminal.

As the frequency used for cellular communication becomes higher with each generation, the service area of a cell is reduced, and a terminal is more likely to operate on a cell edge. Accordingly, when handovers are performed based on received signal strength (RSS) for each base station, terminals located on a cell edge may experience the waste of energy caused by too slow or too frequent handovers. Such a waste of energy may be a serious problem for a terminal with low remaining battery power. Thus, the present disclosure proposes a handover technique capable of maximizing battery efficiency of a terminal under a condition that the quality of service (QoS) is maintained. Through various embodiments proposed herein, the energy of a terminal may be saved.

A handover in an existing cellular communication system is performed based on strength of a signal received from base stations (e.g., reference signal received quality (RSRQ), reference signal received power (RSRP), etc.). That is, when an event condition associated with signal strength from a serving base station and signal strength from a neighbor base station is satisfied, a terminal may transmit a measurement report including signal strength of a serving cell and signal strength of a neighbor cell to a base station and perform a handover according to control of the base station. However, a handover, which is dependent solely on signal strength, does not consider battery efficiency.

Accordingly, depending on a communication environment and a state of a terminal, a time of handover needs to be differently set in order to maximize battery efficiency. For example, in case an uplink data throughput is large, an option of performing a handover relatively early to access a base station requiring weaker transmission power may reduce energy used for communication and be advantageous to battery efficiency. On the other hand, in case a data throughput is equal to or less than a predetermined value, an option of not performing a handover or delaying it as much as possible insofar as QoS is maintained may be more advantageous for battery saving. As a terminal always wants to maximize its battery efficiency under a condition that QoS is maintained, the present disclosure will propose various embodiments that overcome limitations of handover techniques based only on signal strength by an AI algorithm and further support more efficient handover.

Figure 18:
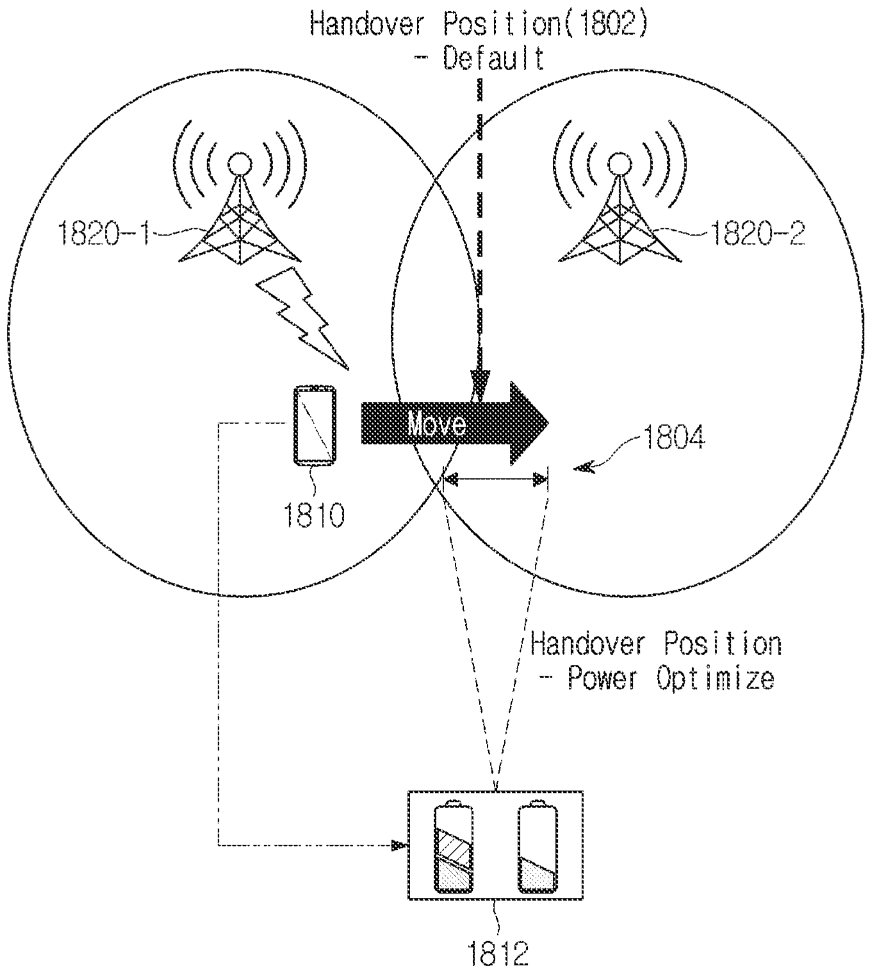
FIG. 18 illustrates a concept of handover in a wireless communication system according to an embodiment of the present disclosure.

A concept of handover according to various embodiments is shown in FIG. 18 below. FIG. 18 illustrates a concept of handover in a wireless communication system according to an embodiment of the present disclosure. Referring to FIG. 18, a first base station 1820-1 operates as a serving base station of a terminal 1810. Herein, the terminal 1810 moves to the coverage of an adjacent second base station 1820-2. According to comparison of signal strength and threshold for the base stations 1820-1 and 1820-2, the terminal 1810 may transmit a measurement report and trigger a handover. Herein, a threshold may be defined as various values or various numbers according to a reported event. For example, an event may include at least one of signal strength of a serving base station lowering below a threshold, signal strength of a neighbor base station rising above a threshold, signal strength of a neighbor base station being higher than signal strength of a serving base station by a difference equal to or greater than a threshold, and signal strength of a serving base station being lower than signal strength of a neighbor base station by a difference equal to or greater than a threshold.

A handover based on a default value of threshold may be triggered at a first position 1802. In order to control a position where a handover is performed by considering battery efficiency, a threshold compared with signal strength may be adjusted according to various embodiments. By adjusting a threshold, a position where a handover is initiated may be changed within coverage 1804. Herein, which of the two base stations 1820-1 and 1820-2 a position where a handover is initiated within coverage 1804 is to be moved closer to, that is, whether to advance or delay the handover time may be determined to improve the efficiency of a battery 1812. In other words, unlike using a fixed threshold for handovers, a handover may be performed by adjusting a threshold so as to maximize battery efficiency of a terminal under a condition that QoS is maintained. In the present disclosure, a threshold may be referred to as a measurement report trigger threshold (MRTTHD).

Figure 19:
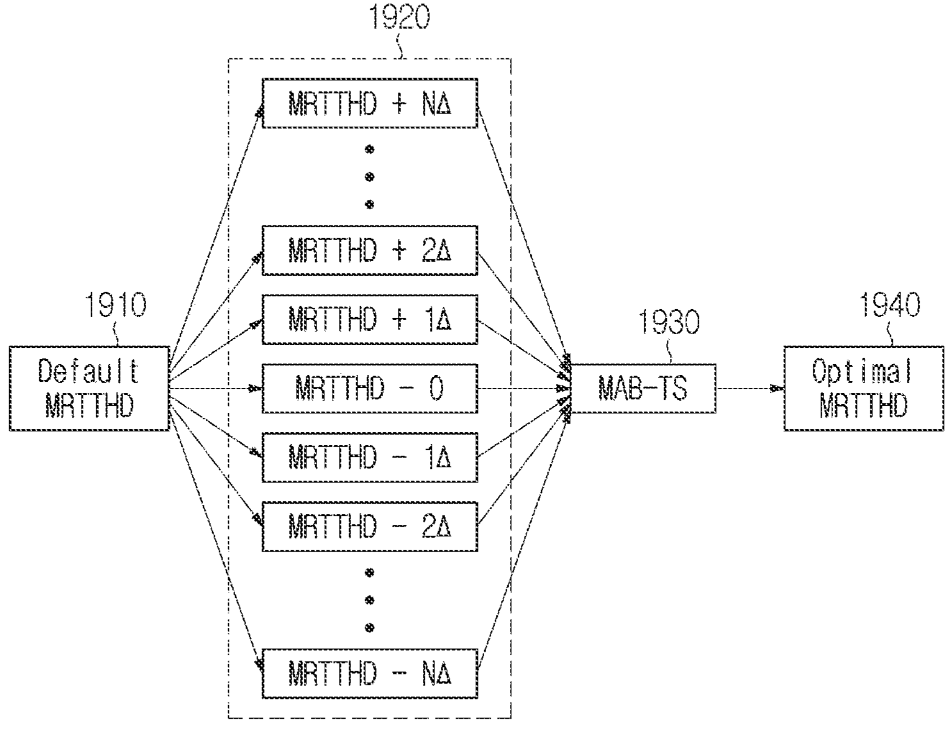
FIG. 19 illustrates a concept of threshold adjustment for handover initiation based on an artificial intelligence algorithm in a wireless communication system according to an embodiment of the present disclosure.

According to an embodiment, a threshold may be adjusted in a manner shown in FIG. 19. FIG. 19 illustrates a concept of threshold adjustment for handover initiation based on an artificial intelligence algorithm in a wireless communication system according to an embodiment of the present disclosure. Referring to FIG. 19, according to various embodiments, a default MRTTHD value 1910 in a measurement configuration provided from a serving cell base station to a terminal may be adjusted, and thus a handover trigger time capable of maximizing battery efficiency of the terminal may be searched. Herein, as shown in FIG. 19, a plurality of adjustment values (e.g., −NΔ to +−NA) may be applied to the default MRTTHD value 1910. Herein, an adjustment value may be referred to as 'offset'. After a handover is performed using an MRTTHD value selected from a plurality of candidate MRTTHD values 1920, the terminal observes whether QoS is maintained and a change in battery consumption rate. An observation result of the terminal is used to train a multi-armed bandits(MAB)-Thompson sampling(TS)-based deterministic model 1930. The MAB-TS-based deterministic model 1930 thus trained may increase a probability that an optimal MRTTHD value 1940 is selected to maintain QoS and maximize battery efficiency.

As shown in FIG. 19, a threshold of signal strength for handover initiation may be adjusted. Herein, a relationship between the increase/decrease of a threshold and the advance/delay of a handover time may be different according to a type of events to which the threshold is applied. For example, in case an event is intended to detect that the signal strength of a serving base station is equal to or less than a threshold, an increase of the threshold may advance a handover time. As another example, in case an event is intended to detect that the signal strength of a neighbor base station is equal to or greater than a threshold, a decrease of the threshold may advance a handover time. Accordingly, various embodiments of the present disclosure may be defined and operated according to each event which a measurement report deals with.

A technique of controlling a time of initiating a handover according to various embodiments may select an optimal MRTTHD adjustment value according to the Thompson sampling (TS) method, which ensures good performance, among multi-armed bandits (MAB) solutions and thus maximize the battery efficiency of a terminal under a condition that QoS is maintained. MAB is a technique of balanced adjustment between exploitation and exploration in recommendations. By applying an MAB technique, a new MRTTHD adjustment value is adequately recommended through exploitation, and feedback associated with the MRTTHD adjustment value may be efficiently reflected in a terminal and every base station. There is a trade-off between exploitation and exploration, and the adjustment of exploitation and exploration may appear to be temporary damage to a terminal, but since a plurality of MRTTHDs are identified through exploration, further efficiency may be ensured on the whole.

Thompson sampling is an algorithm that estimates a reward distribution by using handover result data after selecting an already-observed MRTTHD adjustment value and selects an MRTTHD adjustment value likely to give a highest reward based on the estimated distribution at a high probability. In the most basic Bernoulli TS sampling, a reward of each MRTTHD adjustment value has a value of 0 or 1 at a probability p based on a Bernoulli trial, and a prior probability of p may follow a beta distribution. The beta distribution is defined by Formula 1 below.

[Formula 1]

Figure 20A:
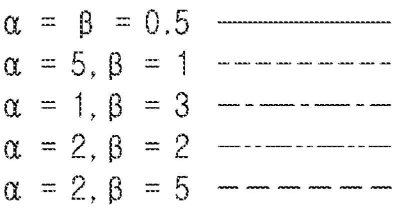
FIG. 20A and FIG. 20B illustrate examples of probability density functions of beta distribution available in a wireless communication system according to an embodiment of the present disclosure.
Figure 20A:
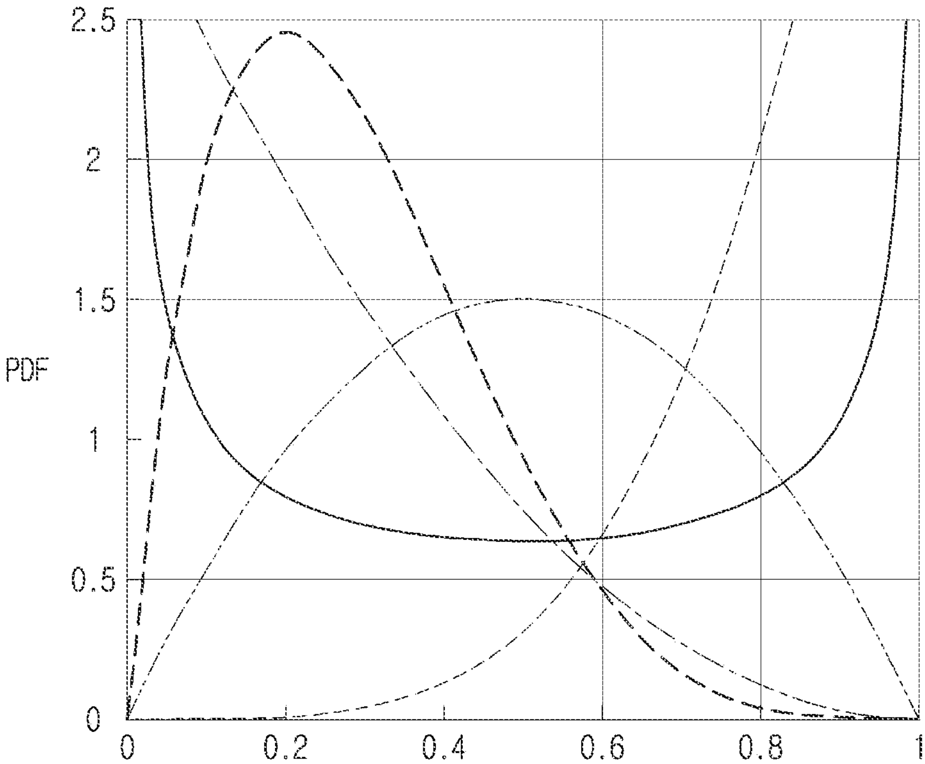
Figure 20B:
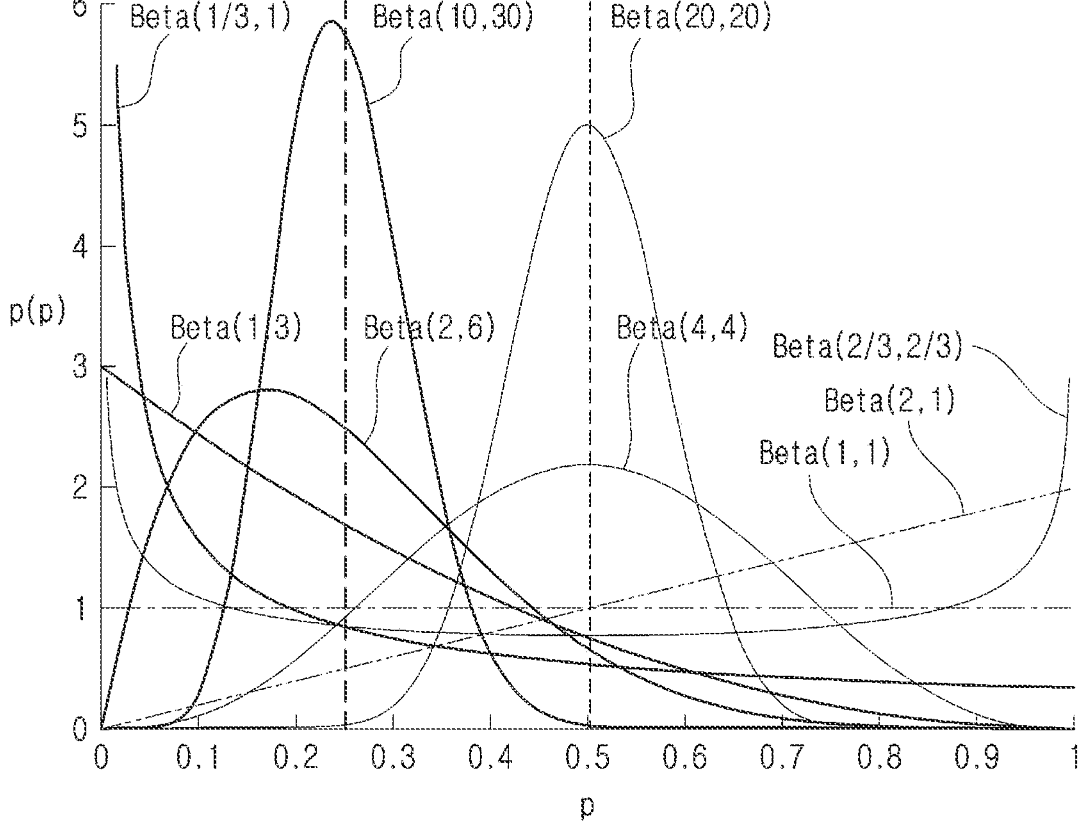

Referring to Formula 1, the beta distribution is a continuous probability distribution defined on the interval [0, 1] with two parameters of α and β. The beta distribution may be visualized on graphs as shown in FIG. 20A and FIG. 20B below. FIG. 20A and FIG. 20B illustrate examples of probability density functions of beta distribution available in a wireless communication system according to an embodiment of the present disclosure. FIG. 20A exemplifies beta distributions where (α, β) is (0.5, 0.5), (5, 1), (1, 3), (2, 2) and (2, 5), and FIG. 20B exemplifies beta distributions where (α, β) is (⅓, 1), (10, 30), (20, 20), (1, 3), (2, 6), (4, 4), (⅔, ⅔), (2, 1) and (1, 1). Referring to FIG. 20A and FIG. 20B, as the value of α/(α+β) increases, a center position of a beta distribution becomes closer to 1, and as the value of 0/(α+β) increases, a center position of a beta distribution becomes closer to 0.

When the Thompson sampling is applied to a handover according to various embodiments. MRTTHD adjustment values (e.g., −NΔ to NΔ of FIG. 19) correspond to beta distributions exemplified in FIG. 20A or FIG. 20B. A reward for each MRTTHD adjustment value may be given as 1 or 0. The parameters a and R are each determined based on the number of times when the reward is 1 and that of times when the reward is 0 in selecting each MRTTHD adjustment value. That is, for a selected MRTTHD adjustment value, in case a reward of 1 and a reward of 0 occur 6 times and twice respectively, a reward probability p of a corresponding MRTTHD adjustment value may be estimated to have a distribution of Beta (6, 2). An MRTTHD adjustment value is selected using probability matching based on an estimated distribution, and this is a method of maximizing a reward for an MRTTHD selected at a base station.

An MRTTHD adjustment value may be selected by a terminal or a base station. To this end, a terminal or a base station selects a single MRTTHD adjustment value based on a beta distribution of each MRTTHD adjustment value and adjusts an MRTTHD by using the selected MRTTHD adjustment value. Herein, an MRTTHD adjustment value to be applied may be selected from candidates of MRTTHD adjustment values which are determined according to a situation or a state of a terminal. That is, candidates of MRTTHD adjustment values may be different according to a state of a terminal. For example, a state of a terminal may include a location of the terminal, a data throughput, remaining battery power, and the like. That is, a plurality of MRTTHD adjustment value candidate sets are defined from all available MRTTHD adjustment values, and a candidate set to be used may be selected based on a state of a terminal. When a candidate set is selected, one of the MRTTHD adjustment values in the selected candidate set may be selected and rewarded.

As the data throughput of a terminal increases, advancing a handover time may reduce a battery consumption rate. Accordingly, in this case, a candidate set including values capable of greatly advancing a handover time among all adjustment values may be selected as a candidate set to be used. For example, when an MRTTHD associated with the signal strength of a serving base station is used, a candidate set may be selected with focus on adjustment values increasing the MRTTHD (e.g., adjustment values with the positive sign (+) and relatively large absolute values). In contrast, as the data throughput of a terminal decreases, delaying a handover time may reduce a battery consumption rate. Accordingly, in this case, a candidate set including values capable of greatly delaying a handover time among all adjustment values may be selected as a candidate set to be used. For example, when an MRTTHD associated with the signal strength of a serving base station is used, a candidate set may be selected with focus on adjustment values significantly decreasing the MRTTHD (e.g., adjustment values with the negative sign (−) and relatively large absolute values).

A beta distribution corresponding to each adjustment value is updated based on an evaluation after a handover. To this end, a terminal may perform a handover based on an adjusted MRTTHD and then collect information for updating a beta distribution. The collected information is used to generate an interest evaluation index and includes items to be considered in controlling a time of a handover. Herein, the collected information and the evaluation index generated based on the collected information may be collectively called 'evaluation information'. For example, when battery efficiency is considered, collected information may be associated with battery consumption. A reward value (e.g., 0 or 1) may be determined through an evaluation of collected information, that is, through an evaluation index generated based on collected information, and a beta distribution corresponding to a corresponding MRTTHD adjustment value may be updated based on the determined reward value. When a reward value is 1, α of a beta distribution increases by 1, and when the reward value is 0, β increases by 1. Information collected for determining a reward value and a rule of determining a reward value from collected information may be variously designed according to items to be reflected in performing a handover.

According to an embodiment, a reward value may be determined based on whether or not QoS is maintained and a change in battery consumption rate. In this case, after a handover is completed, a terminal may observe whether or not QoS is maintained and a change in battery consumption rate and determine a reward value to be reflected in a beta distribution corresponding to an MRTTHD adjustment value selected based on an observation result. Herein, collected information may include a QoS index (e.g., lowest transmission rate, delay time, throughput, etc.), a battery consumption rate, and the like. If QoS is not maintained after a handover or a handover is requested again in a predetermined time, a reward value may be determined to be 0, and on the other hand, if QoS is maintained after a handover and no handover is requested within the predetermined time, a reward value may be determined according to a change in the battery consumption rate. For example, a reward value may be determined as in Formula 2 below.

$$R = \begin{cases} 0, & (P_A - P_B) < P_T \\ 1, & (P_A - P_B) \geq P_T \end{cases} \quad \text{[Formula 2]}$$

In Formula 2, R means a reward value, PA means a battery consumption rate before handover, Ps is a battery consumption rate after handover, and PT means a reference value for the battery consumption rate. The criterion exemplified in Formula 2 is based on a view that, when a decrease in a batter consumption rate is greater than a reference value, a battery is evaluated to further saved by choosing to perform a handover.

Figures 21, 22:
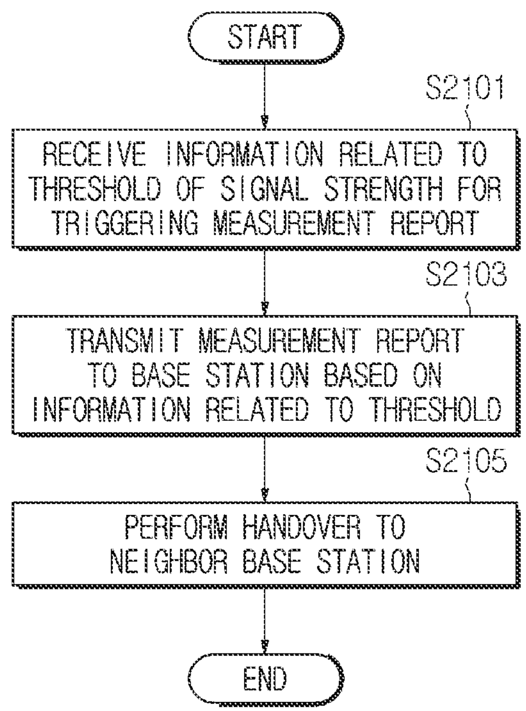
FIG. 21 illustrates an example of a procedure of performing a handover in a wireless communication system according to an embodiment of the present disclosure.
FIG. 22 illustrates an example of a procedure of controlling a handover in a wireless communication system according to an embodiment of the present disclosure.

FIG. 21 illustrates an example of a procedure of performing a handover in a wireless communication system according to an embodiment of the present disclosure. FIG. 21 exemplifies a method of operating a terminal (e.g., the terminal 1810 of FIG. 18).

Referring to FIG. 21, at step S2101, a terminal receives information related to a threshold of signal strength for triggering a measurement report. The information related to the threshold includes a threshold value compared with signal strength measured for triggering a measurement report. Herein, the threshold value received herein may be a default value or a value reflecting an adjustment value. When the adjustment value is determined by the terminal, the received threshold value includes the default value, and when the adjustment value is determined by a base station, the received threshold value includes the value reflecting the adjustment value. In addition, when the adjustment value is determined by the terminal, the information related to the threshold may further include information for determining the adjustment value, for example, information related to a beta distribution of adjustment values (e.g., α, β). That is, the information related to the threshold may be understood to include a threshold value or information necessary to determine the threshold.

At step S2103, the terminal transmits a measurement report based on the information related to the threshold to a base station. The terminal measures signal strength for at least one of a serving base station and a neighbor base station and compares the measured signal strength with a threshold value obtained from the information related to the threshold. In case a comparison result satisfies a condition of an event for a measurement report, the terminal transmits the measurement report notifying at least one of detection of the event and measurement values. Herein, according to an embodiment, in case an adjustment value is determined by the terminal, the terminal may select one of a plurality of adjustment values and determine a threshold value based on selected adjustment values.

At step S2105, the terminal performs a handover to a neighbor base station. That is, after the terminal receives a handover command from a first base station that is a serving base station, the terminal accesses a second base station, which is a neighbor base station, by performing a random access operation for the neighbor base station.

According to an embodiment described with reference to FIG. 21, a terminal may perform a handover by using an adjusted threshold. Although not shown in FIG. 21, after a handover, a terminal may determine information for updating a beta distribution corresponding to an adjustment value used for the handover. For example, the information may be associated with a battery consumption rate and whether or not QoS is satisfied. According to an embodiment, the terminal may forward the information thus determined to a first base station through a second base station. According to another embodiment, the terminal may update the beta distribution based on the determined information and then forward information related to the updated beta distribution (e.g., α, β) to the first base station. According to yet another embodiment, the terminal may determine a reward value based on the determined information and forward the determined reward value to the first base station.

FIG. 22 illustrates an example of a procedure of controlling a handover in a wireless communication system according to an embodiment of the present disclosure. FIG. 22 exemplifies a method of operating a base station (e.g., the base station 1820-1 of FIG. 18).

Referring to FIG. 22, at step S2201, a base station transmits information related to a threshold of signal strength for triggering a measurement report. The information related to the threshold includes a threshold value compared with signal strength measured for triggering a measurement report. Herein, the threshold value transmitted herein may be a default value or a value reflecting an adjustment value. When the adjustment value is determined by the terminal, the transmitted threshold value includes the default value, and when the adjustment value is determined by a base station, the transmitted threshold value includes the value reflecting the adjustment value. In addition, when the adjustment value is determined by the terminal, the information related to the threshold may further include information for determining the adjustment value, for example, information related to a beta distribution of adjustment values (e.g., α, β). That is, the information related to the threshold may be understood to include a threshold value or information necessary to determine the threshold.

At step S2203, the base station receives a measurement report based on the information related to the threshold. The terminal measures signal strength for at least one of a serving base station and a neighbor base station and compares the measured signal strength with a threshold value obtained from the information related to the threshold. In case a comparison result satisfies a condition of an event for a measurement report, the terminal transmits the measurement report notifying at least one of occurrence of the event and measurement values. Herein, according to an embodiment, the terminal may select one of a plurality of adjustment values and determine a threshold value based on selected adjustment values.

At step S2205, the base station controls a handover to a neighbor base station based on the measurement report. The base station confirms that a condition for initiating the handover is satisfied through the measurement report, and transmits a handover request message to the neighbor base station and a handover command message to the terminal.

According to an embodiment described with reference to FIG. 22, a base station may control a handover by using an adjusted threshold. Although not shown in FIG. 22, after a terminal performs a handover to a neighbor base station, a base station may receive information for updating a beta distribution or information related to an updated beta distribution from the terminal through the neighbor base station. Thus, the base station may update a beta distribution owned by it and apply the updated beta distribution to a subsequent handover.

In an embodiment described with reference to FIG. 22, a base station may select an adjustment value and adjust a threshold. In this case, before transmitting information related to the threshold, a terminal may determine a candidate set for selecting an adjustment value, and the base station may receive information on a state of the terminal from the terminal.

According to various embodiments described above, in order to initiate a handover, specifically, a threshold of signal strength used for triggering a measurement report may be adaptively adjusted. A threshold may be adjusted by adding a default value of the threshold and an adjustment value, and herein, the threshold may be adjusted by a terminal or by a base station. Hereinafter, embodiments where a subject adjusting a threshold is a base station or a terminal will be described in further details.

Figure 23:
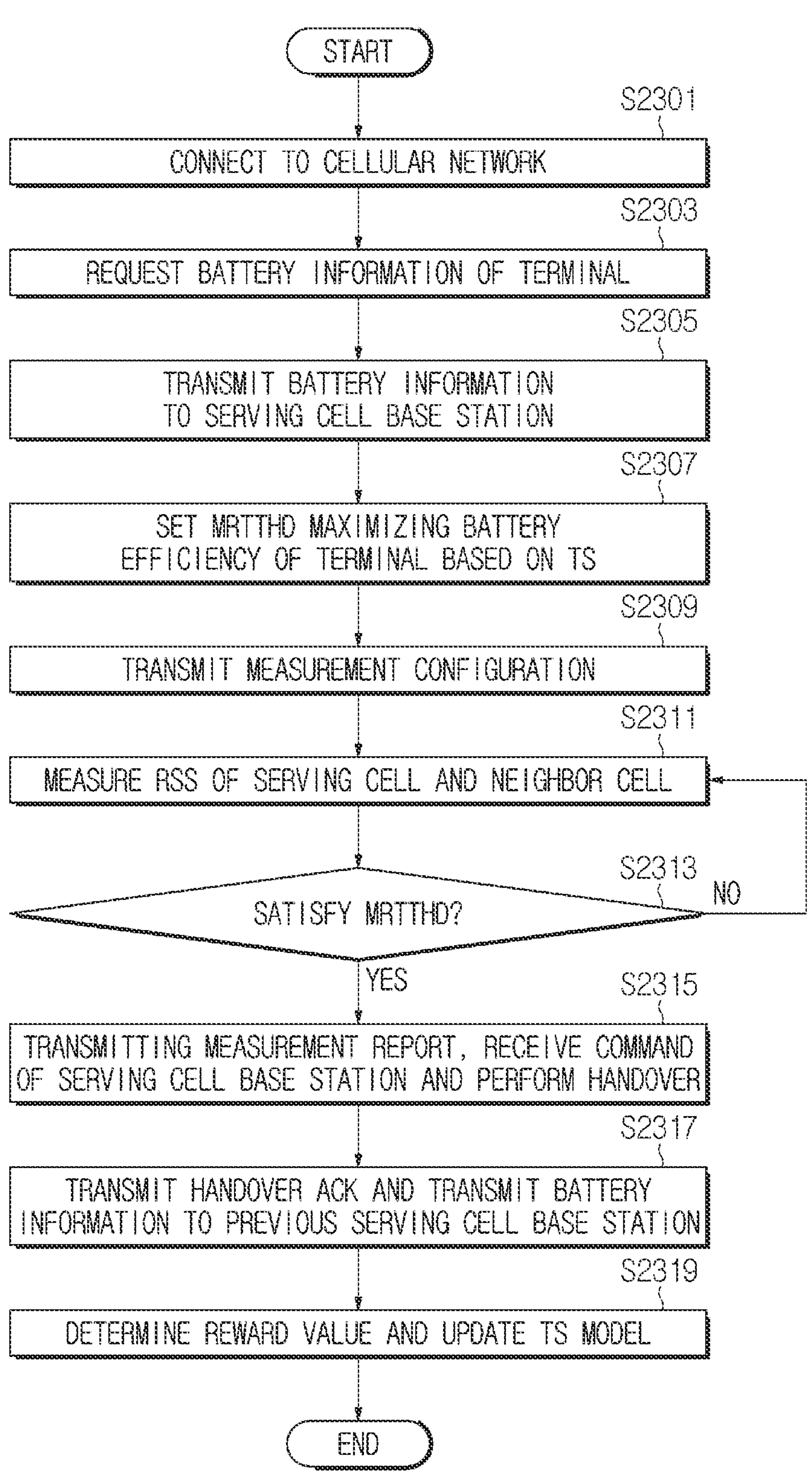
FIG. 23 illustrates an example of a procedure of performing a handover based on a threshold adjusted by a base station in a wireless communication system according to an embodiment of the present disclosure.

FIG. 23 illustrates an example of a procedure of performing a handover based on a threshold adjusted by a base station in a wireless communication system according to an embodiment of the present disclosure. FIG. 23 exemplifies a case where a threshold is adjusted by a base station.

Referring to FIG. 23, at step S2301, a terminal is connected to a cellular network. Next, at step S2303, a base station requests battery information to the terminal. At step S2305, the terminal transmits the battery information of the terminal (e.g., total battery power, remaining power, a consumption rate, a battery power amount consumed to transmit or receive a predefined amount of data, a battery power amount consumed for communication for a predefined stretch of time, and the like) according to a request of a serving cell base station. The base station has information on MRTTHD adjustment value candidates corresponding to a state of the terminal (e.g., location, data throughput, etc.). That is, the base station knows beta distributions reflecting a reward that terminals selecting each MRTTHD adjustment value determine based on an observation result regarding whether or not QoS is maintained and a change in battery consumption rate after performing a past handover.

Accordingly, at step S2307, the base station sets an MRTTHD maximizing battery efficiency of the terminal based on Thompson sampling. Specifically, the base station may select an MRTTHD adjustment value corresponding to a maximum value among randomly sampled values of beta distributions. Herein, a randomly sampled value is selected based on a random single value in each beta distribution and means a value selected in consideration of a probability represented by a beta distribution curve. For example, in case of the beta (20, 20) of FIG. 20B, when random sampling is performed by considering a probability, 0.5 with a highest probability will be selected with highest frequency, but other values than 0.5 may be selected with lower frequency. Next, at step S2309, the base station transmits a measurement configuration to the terminal. That is, the base station reflects an adjustment value in the measurement configuration and transmits the measurement configuration to the terminal.

Next, at step S2311, the terminal measures radio signal strength (RSS) of a serving cell and a neighbor cell. At step S2313, the terminal determines whether or not a measurement result satisfies an adjusted MRTTHD. In case the measurement result satisfies the adjusted MRTTHD, at step S2315, the terminal transmits a measurement report, receives a command of the serving cell base station, and performs a handover. Next, at step S2317, the terminal transmits a handover ACK and transmits battery information after the handover to a previous serving cell base station. At step S2319, the base station determines a reward value and updates a Thompson sampling model.

Figure 24:
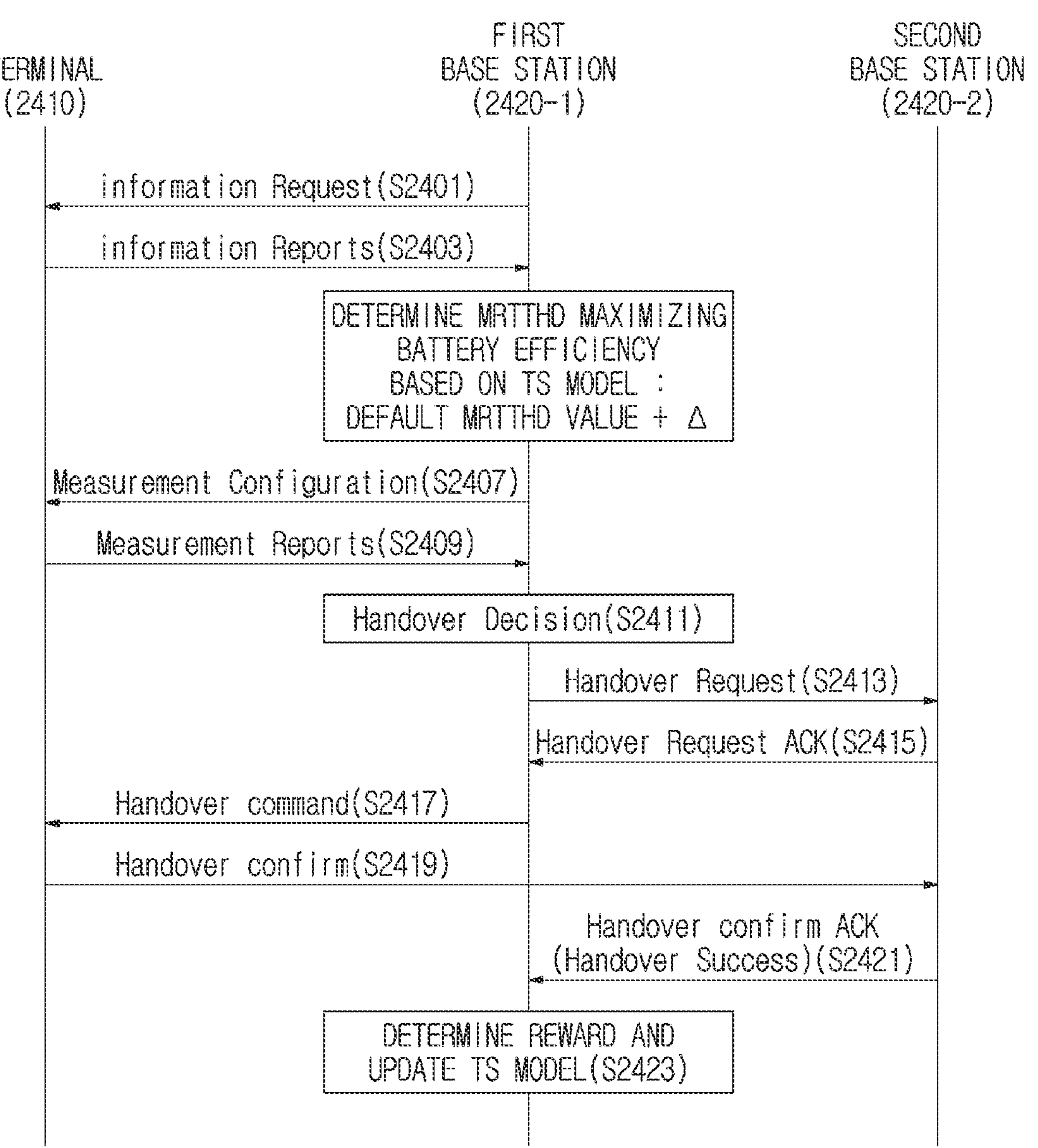
FIG. 24 illustrates a signal flow of a procedure of performing a handover based on a threshold adjusted by a base station in a wireless communication system according to an embodiment of the present disclosure.

FIG. 24 illustrates a signal flow of a procedure of performing a handover based on a threshold adjusted by a base station in a wireless communication system according to an embodiment of the present disclosure. FIG. 24 exemplifies a procedure where a terminal 2410 performs a handover from a first base station 2420-1, which is a serving base station, to a second base station 2420-2, which is a neighbor base station. In the procedure exemplified in FIG. 24, the steps S2401 to S2407 may be understood as handover preparation steps, the steps S2409 to S2421 may be understood as handover steps, and the step S2423 may be understood as a Thompson sampling model update step.

Referring to FIG. 24, at step S2401, the first base station 2420-1 transmits an information request message to the terminal 2410. At step S2403, the terminal 2410 transmits an information report message to the first base station 2420-1. The information report message may include information related to a battery of the terminal 2410 (e.g., total power, remaining power, a consumption rate, a battery power amount consumed to transmit or receive a predefined amount of data, a battery power amount consumed for communication for a predefined stretch of time, and the like). At step S2405, the first base station 2420-1 determines an MRTTHD maximizing battery efficiency based on a Thompson sampling model. Specifically, the first base station 2420-1 may add an adjustment value to a default value of the MRTTHD. Herein, a candidate set of adjustment values for selecting the added adjustment value may be determined based on a state of a terminal (e.g., location, data throughput, battery state, etc.). At step S2407, the first base station 2420-1 transmits a measurement configuration message including the determined MRTTHD to the terminal 2410.

At step S2409, the terminal 2410 transmits a measurement report to the first base station 2420-1. That is, the terminal 2410 measures signal strength for a serving cell and a neighbor cell, and when a measurement result satisfies an MRTTHD, transmits the measurement report to the first base station 2420-1. At step S2411, the first base station 2420-1 determines to perform a handover based on the measurement report. At step S2413, the first base station 2420-1 transmits a handover request message to the second base station 2420-2. At step S2415, the second base station 2420-2 transmits a handover request ACK message to the first base station 2420-1. At step S2417, the first base station 2420-1 transmits a handover command message to the terminal 2410. Accordingly, the terminal 2410 performs the handover. At step S2419, the terminal 2410 accesses the second base station 2420-2 and then transmits a handover confirm message. At step S2421, the second base station 2420-2 transmits a handover confirm ACK message for notifying success of the handover to the first base station 2420-1.

At step S2423, the first base station 2420-1 determines a reward value and updates the Thompson sampling model based on the determined reward value. To this end, the terminal 2410 may include whether or not QoS is maintained after a predetermined time after the handover and battery information (e.g., a change of consumption rate) in the handover confirm message transmitted at step S2419. Accordingly, through the handover confirm ACK message transmitted at step S2421, whether or not QoS is maintained and the battery information may be forwarded to the first base station 2420-1. The first base station 2420-1, which is a previous serving cell of the terminal 2410, may determine a reward value based on the received information and update the Thompson sampling model. However, according to another embodiment, whether or not QoS is maintained and the battery information may be forwarded through separate signaling, not the handover confirm message.

Figure 25:
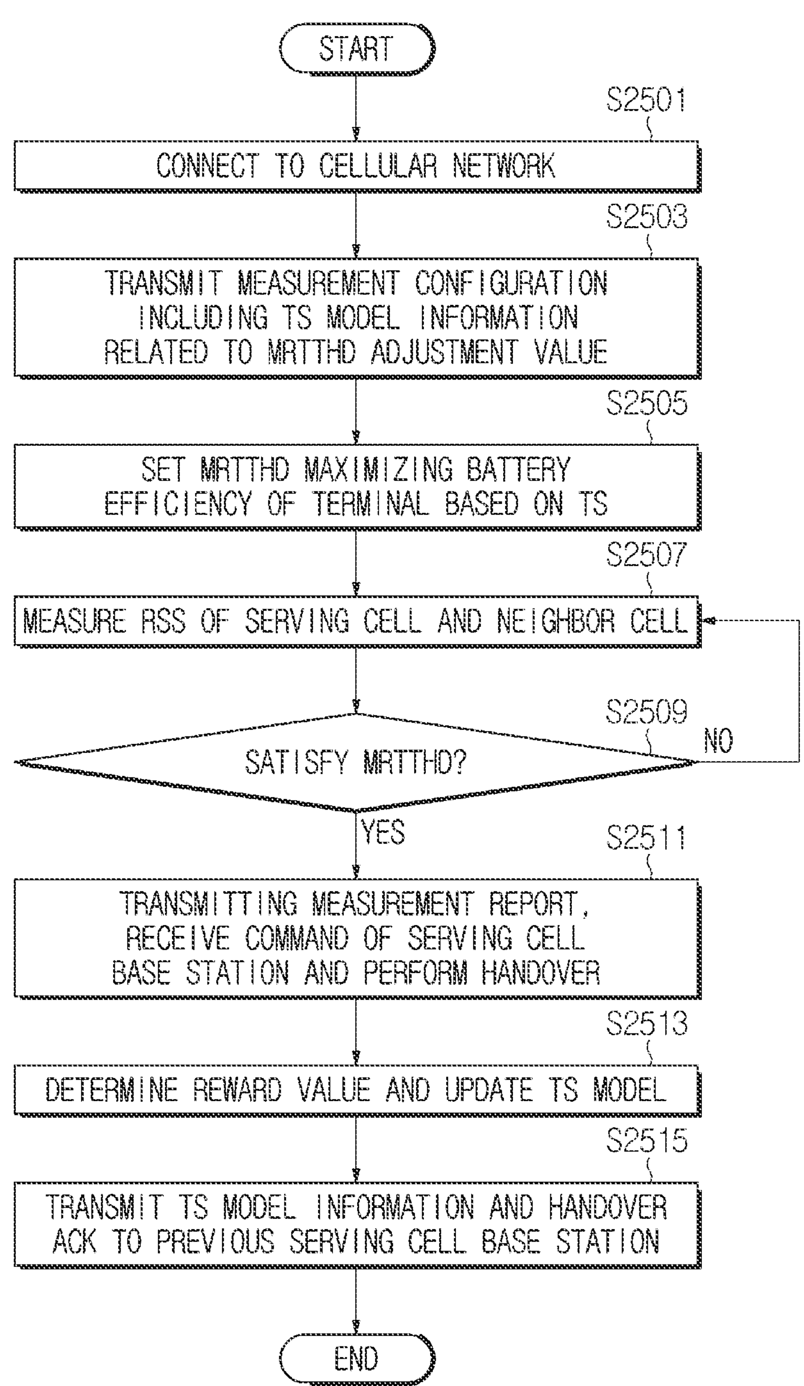
FIG. 25 illustrates an example of a procedure of performing a handover based on a threshold adjusted by a terminal in a wireless communication system according to an embodiment of the present disclosure.

FIG. 25 illustrates an example of a procedure of performing a handover based on a threshold adjusted by a terminal in a wireless communication system according to an embodiment of the present disclosure. FIG. 25 exemplifies a case where a threshold is adjusted by a base station.

Referring to FIG. 25, at step S2501, a terminal is connected to a cellular network. Next, at step S2503, a base station transmits a measurement configuration including Thompson sampling model information related to an MRTTHD adjustment value. That is, the base station transmits a measurement configuration including beta distribution information of a Thompson sampling model associated with an MRTTHD adjustment value corresponding to a state of the terminal (e.g., location, data throughput, etc.) to the terminal. At step S2505, the terminal sets an MRTTHD maximizing battery efficiency of the terminal based on Thompson sampling. Specifically, the terminal may select an MRTTHD adjustment value corresponding to a maximum value among randomly sampled values of beta distributions.

Next, at step S2507, the terminal measures RSS of a serving cell and a neighbor cell. At step S2509, the terminal determines whether or not a measurement result satisfies an adjusted MRTTHD. In case the measurement result satisfies the adjusted MRTTHD, at step S2511, the terminal transmits a measurement report, receives a command of the serving cell base station, and performs a handover. Next, at step S2513, the base station determines a reward value and updates a Thompson sampling model. That is, the terminal determines a reward value according to whether or not QoS is maintained and a change of battery consumption rate after the handover and updates the Thompson sampling model. At step S2515, the terminal transmits information related to the updated Thompson sampling model and a handover ACK to a previous serving cell base station. In other words, the terminal transmits updated beta distribution information corresponding to a selected MRTTHD together with the handover ACK to the previous serving cell base station.

Figure 26:
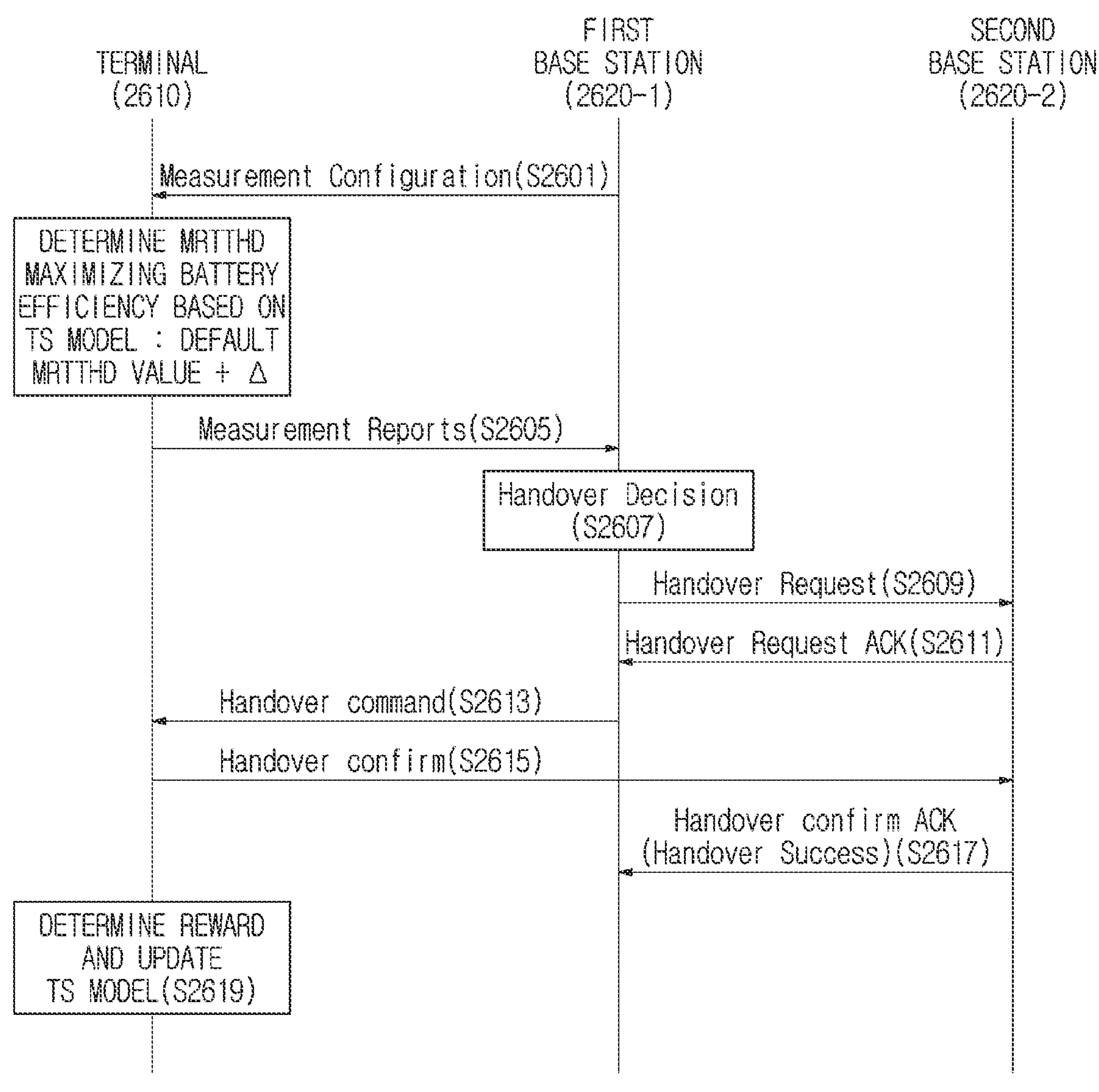
FIG. 26 illustrates a signal flow of a procedure of performing a handover based on a threshold adjusted by a terminal in a wireless communication system according to an embodiment of the present disclosure.

FIG. 26 illustrates a signal flow of a procedure of performing a handover based on a threshold adjusted by a terminal in a wireless communication system according to an embodiment of the present disclosure. FIG. 26 exemplifies a procedure where a terminal 2610 performs a handover from a first base station 2620-1, which is a serving base station, to a second base station 2620-2, which is a neighbor base station.

Referring to FIG. 26, at step S2601, the first base station 2620-1 transmits a measurement configuration message to the terminal 2610. Herein, the measurement configuration message includes information related to a Thompson sampling model. Specifically, the measurement configuration message includes information related to beta distributions corresponding to candidate values of adjustment values of MRTTHD. To this end, the first base station 2620-1 may determine a candidate set of adjustment values based on a state of the terminal 2610. At step S2603, the terminal 2610 determines an MRTTHD maximizing battery efficiency based on the Thompson sampling model. Specifically, the first base station 2620-1 may add an adjustment value to a default value of the MRTTHD.

At step S2605, the terminal 2610 transmits a measurement report to the first base station 2620-1. That is, the terminal 2610 measures signal strength for a serving cell and a neighbor cell, and when a measurement result satisfies an MRTTHD, transmits the measurement report to the first base station 2620-1. At step S2607, the first base station 2620-1 determines to perform a handover based on the measurement report. At step S2609, the first base station 2620-1 transmits a handover request message to the second base station 2620-2. At step S2611, the second base station 2620-2 transmits a handover request ACK message to the first base station 2620-1. At step S2613, the first base station 2620-1 transmits a handover command message to the terminal 2610. Accordingly, the terminal 2610 performs the handover. At step S2615, the terminal 2610 accesses the second base station 2620-2 and then transmits a handover confirm message. At step S2617, the second base station 2620-2 transmits a handover confirm ACK message for notifying success of the handover to the first base station 2620-1.

At step S2619, the terminal 2610 determines a reward value and updates the Thompson sampling model based on the determined reward value. To this end, the terminal 2610 may observe whether or not QoS is maintained after a predetermined time after the handover and battery information (e.g., a change of consumption rate) and determine the reward value based on an observation result. Next, although not shown in FIG. 26, the terminal 2610 may transmit information related to the updated Thompson sampling model to the first base station 2620-1.

As shown in the various embodiments described above, when a Thompson sampling model is used, handover performance may be gradually improved based on performance evaluation after a handover. A beta distribution update according to a reward in a Thompson sampling model is as shown in FIG. 27.

Figure 27:
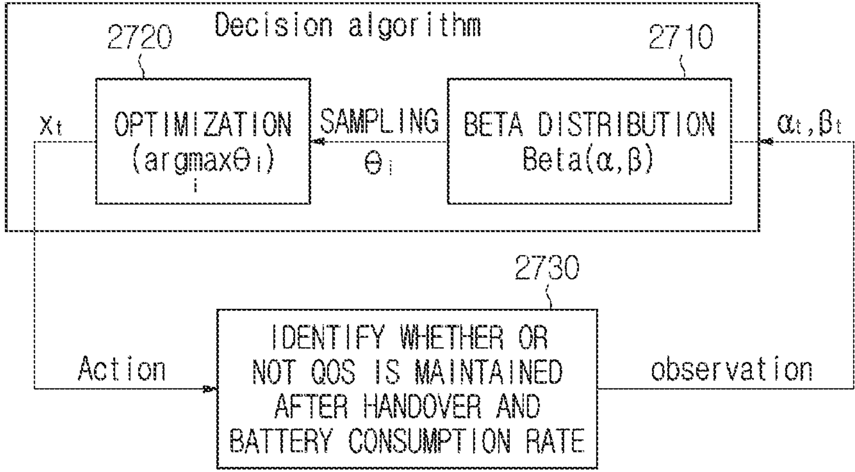
FIG. 27 illustrates a reward structure based on Thompson sampling in a wireless communication system according to an embodiment of the present disclosure.

FIG. 27 illustrates a reward structure based on Thompson sampling in a wireless communication system according to an embodiment of the present disclosure. FIG. 27 shows a feedback structure of rewards based on an evaluation index (e.g., whether or not QoS is maintained, change in battery consumption rate) after the completion of a handover. Referring to FIG. 27, sampling includes an operation of randomly sampling a value in a beta distribution 2710 corresponding to an MRTTHD adjustment value which is a candidate in a current state of a terminal. From sampled values, a maximum value is selected by optimization 2720. An action includes operations of selecting an MRTTHD corresponding to the selected maximum value, reflecting the selected MRTTHD in a measurement configuration and then transmitting it to a terminal. An observation includes an operation of updating parameters of a beta distribution for a reward based on evaluation 2730 that identifies whether or not QoS is maintained and a change in battery consumption rate after the completion of a handover. The updated parameters are reflected in the beta distribution 2710.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a terminal in a wireless communication system, the method comprising:

receiving configuration information related to a measurement report from a base station;

transmitting the measurement report to the base station based on the configuration information; and performing a handover from the base station to a neighbor base station, wherein the configuration information includes a threshold of signal strength for triggering the measurement report, that is determined based on a probability distribution determined based on information observed by terminals performing a handover in the base station, and wherein the probability distribution is determined based on a reward value, the reward value being determined based on observed information including at least one of information related to whether quality of service of the terminal is maintained or information related to a change in a battery consumption rate.

2. The method of claim 1, wherein the information related to the threshold includes one of a threshold value adjusted based on an adjustment value determined by the base station and information related to a probability distribution of each adjustment value necessary to adjust the threshold.

3. The method of claim 1, further comprising transmitting information related to a battery state of the terminal to the base station, wherein the battery state includes at least one of total power of a battery of the terminal, remaining power, a consumption rate, a battery power amount consumed to transmit or receive a predefined amount of data, and a battery power amount consumed for communication for a predefined stretch of time.

4. The method of claim 1, further comprising:

checking probability distributions selectable adjustment value candidates in the information related to the threshold;

selecting one adjustment value among the adjustment value candidates based on the probability distributions; and determining a threshold value for determining whether or not to trigger the measurement report based on the adjustment value.

5. The method of claim 1, further comprising transmitting at least one of evaluation information for updating the probability distribution and information related to the probability distribution updated based on the evaluation information, after the handover is completed.

6. The method of claim 1, further comprising transmitting a handover confirm message including evaluation information for updating the probability distribution to the neighbor base station.

7. The method of claim 1, wherein the probability distribution includes a beta distribution.

8. A method performed by a base station in a wireless communication system, the method comprising:

transmitting configuration information related to a measurement report to a terminal;

receiving the measurement report generated by the terminal based on the configuration information; and controlling the terminal to perform a handover from the base station to a neighbor base station, wherein the configuration information includes a threshold of signal strength for triggering the measurement report, that is determined based on a probability distribution determined based on information observed by terminals performing a handover in the base station, and wherein the probability distribution is determined based on a reward value, the reward value being determined based on observed information including at least one of information related to whether quality of service of the terminal is maintained or information related to a change in a battery consumption rate.

9. The method of claim 8 further comprising determining selectable adjustment value candidates for adjusting the threshold based on a state of the terminal, wherein the state includes at least one of a location of the terminal and data throughput of the terminal.

10. The method of claim 8 further comprising receiving information related to a battery state of the terminal from the terminal, wherein the battery state includes at least one of total power of a battery of the terminal, remaining power, a consumption rate, a battery power amount consumed to transmit or receive a predefined amount of data, and a battery power amount consumed for communication for a predefined stretch of time.

11. The method of claim 8 further comprising:

checking probability distributions of selectable adjustment value candidates for adjusting the threshold;

selecting one adjustment value among the adjustment value candidates based on the probability distributions; and determining a threshold value for determining whether or not to trigger the measurement report based on the adjustment value.

12. The method of claim 8 further comprising:

receiving evaluation information for updating the probability distribution from the terminal, after the handover is completed; and updating the probability distribution based on the evaluation information.

13. The method of claim 8 further comprising receiving an updated probability distribution from the terminal, after the handover is completed.

14. A terminal in a wireless communication system, the terminal comprising:

a transceiver; and a processor coupled with the transceiver, wherein the processor is configured to:

receive configuration information related to a measurement report from a base station, transmit the measurement report to the base station based on the configuration information, and perform a handover from the base station to a neighbor base station, and wherein the configuration information includes a threshold of signal strength for triggering the measurement report, that is determined based on a probability distribution determined based on information observed by terminals performing a handover in the base station, and wherein the probability distribution is determined based on a reward value, the reward value being determined based on observed information including at least one of information related to whether quality of service of the terminal is maintained or information related to a change in a battery consumption rate.

* * * * *